United States Patent
Scanlan et al.

(10) Patent No.: US 11,682,758 B2
(45) Date of Patent: Jun. 20, 2023

(54) PROCESS FOR METALLIZATION OF ELECTROCHEMICALLY ACTIVE POWDERS

(71) Applicant: A123 Systems LLC, Waltham, MA (US)

(72) Inventors: Kevin Scanlan, Boston, MA (US); Derrick Spencer Maxwell, Winthrop, MA (US); Derek Johnson, Fort Collins, CO (US); Jun Wang, Shrewsbury, MA (US); Rocco Iocco, Beverly, MA (US); Weidong Zhou, Waltham, MA (US)

(73) Assignee: A123 Systems LLC, Waltham, MA (US)

( * ) Notice: Subject to any disclaimer, the term of this patent is extended or adjusted under 35 U.S.C. 154(b) by 514 days.

(21) Appl. No.: 16/644,950

(22) PCT Filed: May 18, 2018

(86) PCT No.: PCT/US2018/033429
§ 371 (c)(1),
(2) Date: Mar. 5, 2020

(87) PCT Pub. No.: WO2019/045805
PCT Pub. Date: Mar. 7, 2019

(65) Prior Publication Data
US 2020/0328408 A1   Oct. 15, 2020

Related U.S. Application Data

(60) Provisional application No. 62/553,067, filed on Aug. 31, 2017.

(51) Int. Cl.
*H01M 4/00* (2006.01)
*H01M 4/36* (2006.01)
(Continued)

(52) U.S. Cl.
CPC .......... *H01M 4/366* (2013.01); *H01M 4/133* (2013.01); *H01M 4/134* (2013.01); *H01M 4/38* (2013.01);
(Continued)

(58) Field of Classification Search
CPC .. H01M 4/625; H01M 10/0525; H01M 4/362; H01M 4/622; H01M 4/366; Y02E 60/10
See application file for complete search history.

(56) References Cited

U.S. PATENT DOCUMENTS

2015/0318530 A1* 11/2015 Yushin .................. H01M 10/36
429/131

FOREIGN PATENT DOCUMENTS

JP        2013168351 A  *  8/2013  .......... H01M 10/054

OTHER PUBLICATIONS

"Battery Pack" Sato et al.JP 2013168351 A Published Aug. 29, 2013. machine translation. (Year: 2013).*
(Continued)

*Primary Examiner* — Cynthia H Kelly
*Assistant Examiner* — Monique M Wills
(74) *Attorney, Agent, or Firm* — McCoy Russell LLP

(57) ABSTRACT

Materials and methods for coating an electrochemically active electrode material for use in a lithium-ion battery are provided. In one example, an electrochemically active electrode material comprises: a polymer coating applied directly to an exterior surface of the electrochemically active electrode material; a metal plating catalyst adhered to the continuous polymer; and a continuous metal coating that completely covers the metal catalyst and continuous polymer coating. The electrochemically active electrode material may comprise a powder comprising one or more secondary
(Continued)

particles, and the polymer and metal coatings may be applied to exterior surfaces of these secondary particles.

41 Claims, 12 Drawing Sheets

(51) Int. Cl.
  H01M 4/133    (2010.01)
  H01M 4/134    (2010.01)
  H01M 4/38     (2006.01)
  H01M 4/587    (2010.01)
  H01M 4/62     (2006.01)
  H01M 4/90     (2006.01)
  H01M 10/0525  (2010.01)
  H01M 4/02     (2006.01)

(52) U.S. Cl.
  CPC ........... *H01M 4/587* (2013.01); *H01M 4/622* (2013.01); *H01M 4/9083* (2013.01); *H01M 10/0525* (2013.01); *H01M 2004/027* (2013.01)

(56) References Cited

OTHER PUBLICATIONS

Guo, K. et al., "Nano-scale copper-coated graphite as anode material for lithium-ion batteries," Journal of Applied Electrochemistry, vol. 32, No. 6, Jun. 2002, 7 pages.

Matsui, J. et al., "Electroless Copper Plating onto Polymide Using Polymer Nanosheet as a Nano-Adhesive," Polymer Journal, vol. 39, No. 1, Nov. 24, 2006, 7 pages.

Mondin, G. et al., "Metal deposition by electroless plating on polydopamine functionalized micro- and nanoparticles," Journal of Colloid and Interface Science, vol. 411, Dec. 1, 2013, Available Online Aug. 28, 2013, 7 pages.

Cetinkaya, T. et al., "Improvement cycleability of core-shell silicon/copper composite electrodes for Li-ion batteries by using electroless deposition of copper on silicon powders," Powder Technology, vol. 253, Feb. 2014, Available Online Nov. 14, 2013, 7 pages.

Fujii, S. et al., "Electroless nickel plating on polymer particles,"Journal of Colloid and Interface Science, vol. 430, May 29, 3014, 9 pages.

ISA Korean Intellectual Property Office, International Search Report and Written Opinion Issued in Application No. PCT/US2018/033429, dated Feb. 28, 2019, WIPO, 14 pages.

\* cited by examiner

PROCESS FOR METALLIZATION OF ELECTROCHEMICALLY ACTIVE POWDERS

CROSS REFERENCE TO RELATED APPLICATION

The present application is a U.S. National Phase of International Patent Application Serial No. PCT/US2018/033429 entitled "PROCESS FOR METALLIZATION OF ELECTROCHEMICALLY ACTIVE POWDERS", filed on May 18, 2018. International Patent Application Serial No. PCT/US2018/033429 claims priority to U.S. Provisional patent Application No. 62/553,067, entitled "PROCESS FOR METALLIZATION FOR ELECTROCHEMICALLY ACTIVE POWDERS", and filed on Aug. 31, 2017. The entire contents of the above-listed application are hereby incorporated by reference for all purposes.

FIELD OF THE INVENTION

This application relates generally to systems and methods for coating electrochemically active powders that form the electrodes of electrochemical energy storage devices such as lithium-ion batteries.

BACKGROUND AND SUMMARY

Rechargeable batteries are a type of electrochemical energy storage device that enable a large amount of electrical energy to be repeatedly stored and released via the reversible conversion between electrical energy and chemical potential energy. Due to increasing demands for higher energy density batteries from the energy industry and other consumers, the rechargeable battery industry has shifted to using predominantly lithium-ion batteries. Because lithium is the lightest and most electropositive metal, it is one of the most attractive elements to incorporate into electrochemical energy storage devices that require high energy density.

A typical Li-ion battery cell includes a positive electrode (cathode), a negative electrode (anode), an ionic electrolyte solution that supports the movement of lithium ions back and forth between the two electrodes, and a porous separator that keeps the anode and cathode electrically isolated. Li-ion batteries can repeatedly store and discharge electrical energy through reversible electrochemical reduction and oxidation reactions which occur in electrochemically active materials incorporated into both the positive and negative electrodes. During discharge for example, lithium ions move through the electrolyte from the anode to the cathode to produce electric current. Transition metal oxides and phosphates are commonly used as the electrochemically active material in the positive electrode (cathode), while various types of carbon are typically used as the electrochemically active material in the negative electrode (anode). Such electrochemically active electrode materials are usually used in the form of a fine powder which is applied to a current collector using a binder and conductive additives, in order to allow a high interfacial area for electrochemical reactions and to facilitate lithium ion transport.

While charging and discharging a Li-ion battery, electrochemical reactions take place at the interface between the electrolyte and the electrochemically active electrode materials. In particular lithium ions move between the active electrode materials and the electrolyte. However, when directly exposed to the electrolyte, these electrochemically active electrode materials may also catalyze the decomposition of the electrolyte, which results in reduced electrochemical cycling performance and diminished Coulombic efficiency (discharge capacity divided by the charge capacity during a given charge/discharge cycle) of the battery cell. Additionally, the decomposition of organic electrolyte and subsequent gas production lowers the flash point of the electrolyte, reducing the safety of the battery and increasing the risk of fire.

Therefore, the surfaces of the electrochemically active electrode materials may be modified, by applying a coating for example, to prevent or minimize the unwanted parasitic side reactions of the active material with the electrolyte and improve the cycle life of the battery. Thus, the surfaces of the active electrode materials may be modified to improve their performance by favorably changing their surface properties without significantly affecting their bulk properties (energy storage capacity). In order to have a minimal impact on the favorable bulk properties (in particular, the energy storage capacity) of the original material, such surface modifications are preferred to be as thin as possible while still sufficiently modifying the surface properties. One such type of surface modification involves coating an electrochemically active electrode material with a thin and continuous layer of a metal or alloy ("powder metallization"), such that the surface properties of the composite material closely resemble those of the alloy or metal coating, and the bulk properties closely resemble that of the original powder.

A metal coating on an electrochemically active electrode material may either be electrochemically active or inactive at the required potentials to store energy. Coating an active material with an electrochemically inactive metal may result in higher electrical conductivity and lower charge-transfer resistance, allowing faster charge and discharge rates. However, depositing metals that are not electrochemically active can significantly reduce the specific capacity of the electrode material.

On the other hand, coating with electrochemically active metals may result in: resistance to solvent co-intercalation, higher electronic conductivity, lower charge transfer impedance, better cycle life, and higher intercalation capacity. Thus, the energy density of a Li-ion battery may be increased by coating an active material with another electrochemically active metal having a higher energy storage capacity. Jae Woo Kim et al. for example disclose that silicon powder coated with copper via electroless deposition (ELD) results in better cycle life, electronic conductivity, and coulombic efficiency compared to pure silicon powder when used as an anode material in a Li-ion battery. Gao et al. discloses that graphite powder coated with copper via ELD shows higher resistance to solvent co-intercalation than pure graphite when used as an anode material in a Li-ion battery.

Several different approaches exist for depositing a thin metal film (<1 um thick) on a metal such as an electrochemically active electrode material. For example, physical vapor deposition (PVD) is capable of producing nanometer-thick films of most metals; however, it is a line-of-sight technique, which makes it extremely difficult to coat surfaces that are not flat and uniform. As another example, chemical vapor deposition (CVD) is also capable of producing metal coatings of similar thickness to PVD, and is less restricted by line-of-sight. However, both PVD and CVD require expensive high vacuum equipment with low throughput, so neither are economically viable for the mass production of metallized powders.

Another method for depositing thin metal films onto a substrate is by electrodeposition from a solution of metal ions, whereby an external electrical power supply provides a source of electrons that reduce metal ions onto the surface of the substrate. Traditional electrochemical deposition requires electrical contact between the working electrode (the substrate being plated) and the counter electrode, otherwise no current will flow through the substrate and no metal will be deposited onto it. It is not feasible to make constant electrical contact with each particle of a fine powder while simultaneously ensuring that the surface of the powder is unobstructed, so traditional electrochemical deposition is not a commercially viable method for powder metallization.

The most widely used metal coating method is electroless deposition ("ELD"), in which an aqueous reducing agent is autocatalytically oxidized on the surface of a metal, providing a source of electrons that does not require electrical contact. These electrons conduct through the metal and subsequently reduce solvated metal ions to metallic form on the surface of the metal deposit, causing it to grow in thickness. An ELD plating bath must contain a soluble metal salt which provides a source of metal ions, a reducing agent capable of being autocatalytically oxidized on the metal surface, and a complexing agent which prevents spontaneous decomposition of the plating bath. In order to initiate ELD on a surface that does not have catalytic activity for oxidation of a suitable reducing agent, a seed layer of a metal with high catalytic activity (herein referred to as the "catalyst") must first be applied.

The catalyst is typically a discontinuous but substantially close-packed layer of metal nanoparticles with a diameter of less than about 10 nm. As the ELD reaction proceeds and metal is deposited onto the catalyst particles, they form hemispherical metal islands on the substrate which grow in size until adjacent islands merge together to form a continuous metal film. The minimum thickness required to achieve a continuous film is the average thickness (total volume/total area) at which all metal islands have merged together into one compact layer. In order to achieve a low minimum thickness (<150 nm), the diameter of the catalyst particles must be minimized to maximize their areal site density (number of particles/area). It is also critical to ensure that the catalyst particles have excellent adhesion to the substrate (electrochemically active electrode material), since areas of the electrode material where catalyst particles have detached will not be coated with metal.

The catalyst particles are typically comprised of precious metals (PMs), such as palladium, platinum, rhodium, gold or silver. PMs are used due to their high catalytic activity towards the oxidation of most common aqueous reducing agents, as well as their ease of reduction from cationic to elemental states. In traditional ELD catalyst processes, PM nanoparticles are applied to the surface of the substrate in one of two ways. In a first method, PM cations are adsorbed on the surface of the substrate by immersing in an aqueous solution of a PM salt, often including a complexing agent. The substrate is subsequently treated with an aqueous reducing agent, which nucleates PM nanoparticles on the surface. In a second method, a PM salt and a reducing agent are mixed beforehand, often along with a dispersant, creating a colloid of PM nanoparticles. The substrate is then treated with this colloid, relying on the physical adhesion of PM nanoparticles to the surface of the substrate. Although PM catalysts for ELD have been extensively studied for their use on macroscale substrates, especially in the semiconductor industry, there has been considerably less study on their use for metallization of fine powders. Thus the traditional metallization processes described above typically comprise PM catalysts that are developed to be used on relatively smooth and uniform surfaces, in an environment where the process can be precisely controlled. And because of their high expense, PM catalysts are typically used in small amounts to keep the product cost relatively low.

However, the inventors herein have recognized potential issues with the above metallization approaches for macroscale substrates when applied to metallizing fine powders. As one example, such ELD metallization processes are expensive when used on electrochemically active electrode powders. Because the specific surface area of a fine electrochemically active electrode powder is much greater (more than 1000 times greater) than a typical macroscale substrate used in conventional ELD metallization processes, up to 1000 times more PM catalyst must be used to catalyze the surface. As described above, the PM catalyst comprises an expensive material such as palladium, and thus the cost of coating an electrode powder with a PM catalyst using an ELD approach is significantly increased.

As another example, such metallization processes are not entirely effective at continuously coating the substrate when used on fine electrode powders. As a result, the coating may not be effective at preventing electrolyte decomposition by the active material. In particular, due to the inherently higher surface irregularity of most fine powders compared to traditional large, smooth ELD substrate surfaces, combined with the high shear stresses involved with many powder processing techniques, it is significantly more challenging to ensure a sufficiently dense and uniform catalyst layer capable of producing a continuous, thin metal film. Thus, the above approaches for adhering the catalyst to a substrate are significantly less effective at adhering the catalyst when powders are used as the substrate. Because the above metallization approaches produce a lower areal density of the catalyst on a powder compared to the traditional macroscale substrates, the resulting metal coatings are typically discontinuous and/or non-uniform, and therefore still expose portions of the active electrode material powders to the electrolyte. As such, conventional metallization approaches still allow the electrolyte decomposition reactions to occur on the surface of the electrochemically active materials, thereby reducing their performance.

Some approaches for powder metallization using ELD do exist, however most of these approaches are used on non-conductive powders for use in conductive inks, adhesives, and the like. For example, Oyamada et al. discloses methods for creating substantially continuous nickel coatings on fine powders for use as a conductive additives. In particular, Oyamada utilizes a catalyst process by which palladium ions are adsorbed onto the surface of the powder (which may be pre-treated to increase adsorption), then subsequently treated with an aqueous reducing agent to nucleate palladium nanoparticles on the surface. Alexander et al. discloses a similar method for coating silicate particles with PMs for use in composite castings. Similar approaches are demonstrated by Gao et al. and Shukla et al., where copper metal is deposited on graphite and fly ash powders, respectively.

The inventors herein have recognized potential issues with the above ELD powder metallization approaches when applied to electrochemically active materials. As one example, because the PM catalysts do not adhere well to electrochemically active materials like they do to some of the conventional, inert powders of the prior art, they may again suffer from low areal density on the surface of the electrochemically active electrode materials, thereby resulting in a discontinuous metal coating. More specifically, adhesion of the ELD catalyst to the substrate must be excellent in order to achieve a completely continuous, uniform metal coating with the minimum possible thickness. If the ELD catalyst does not sufficiently adhere to the substrate and does not have a high enough areal density, then the evenness and continuity of the resulting metal coating will be comprised since the deposition of the metal on the substrate depends on the presence of the ELD catalyst on the surface of the substrate. Thus, the catalyst layer ideally nucleates as a uniform close-packed structure, and any catalyst particles that detach from the substrate will result in a discontinuous coating. Any sensitivity of the process (either to the surface properties of the substrate or the processing conditions) may result in poor catalyst adhesion.

Precious metal ELD catalysts tend to not adhere well to electrochemically active electrode powders as compared to their conventional ELD substrate counterparts and tend to be more sensitive to the surface properties of the material. In particular, surface properties of conventional ELD substrates can be more precisely controlled than electrochemically active electrode powders. Because the electrochemically active electrode materials of lithium-ion batteries tend to be poor adsorbers of PM ions, they may need to be pretreated to increase surface functionalization of PM capturing groups. Relying on surface functionalization to increase PM adsorption may cause several complications, including making the process more sensitive to impurities on the surface of the material. This in turn may require the use of higher purity and more expensive raw materials. Further, many surface modification techniques that would increase PM adsorption may not be compatible with the electrochemically active materials of lithium-ion batteries. Each material or class of materials may require a different pretreatment method, making it more difficult and costly to develop and scale up processes for multiple materials.

Further, high shear stresses introduced during material processing of the electrodes are likely to cause catalyst particles to detach from the electrochemically active electrode materials. This is due to the fact that the reduction reaction forming metal nanoparticles takes place at the substrate-liquid interface, and the adhesion of these nanoparticles is mostly due to electrostatic interactions. If a colloidal catalyst process is used, then the adhesion is entirely due to electrostatic interactions. Because of this, the adhesion of the nanoparticles is sensitive to the surface chemistry of the material, the composition of the catalyst and plating baths (particularly ionic strength and pH), and on the mechanical stresses created during material processing. Oyamada et al. reported that when using a traditional PM ELD catalyst, the surface area of the powder in the ELD plating bath must be kept below 10 $m^2/L$ (equivalent to about 10 g/L for typical Li-ion active materials). The use of such a low solid loading would result in the need for larger equipment to achieve the desired throughput, as well as an increase in waste.

Some approaches have been shown which employ an ELD process, without a catalyst step. For example, Palaniappa et al. discloses a method for depositing discontinuous nickel coatings on graphite powder using a thermal activation process with no PM catalyst, and Jae Woo Kim et al. reports a method for depositing a mostly continuous layer of copper metal onto the surface of silicon powder following etching with hydrofluoric acid. However, both of these ELD processes result in poor performance because the coatings are not continuous.

Some approaches aimed at powder metallization forgo ELD altogether. A different approach to ELD catalysts is demonstrated by Li et al., in which a polyimide film is impregnated with silver ions and subsequently heated in air to thermally reduce the silver and nucleate catalyst particles on the surface of the polyimide. Dow et al. reports a similar method whereby copper is impregnated instead of silver, and an aqueous reducing agent is used to nucleate catalytic copper nanoparticles on the surface. Theoretically, if a continuous polyimide layer could be applied to a fine powder, then similar methods could be used for the ELD catalyst, although this has not been previously reduced to practice.

An approach for coating polymers onto fine powders is demonstrated by Rowe, in which a solvent based process is used, where the powder is dispersed in an organic solvent containing the polymer to be coated, and a non-solvent is slowly added to precipitate the polymer on the surface of the powder. Smith-Johannsen et al. disclose using a high temperature fluid energy mill to coat polymers onto fine powders by evaporating an organic solvent from a polymer solution.

However, the inventors herein have recognized potential issues with the above polymer coating and metallization approaches. As one example, the approaches disclosed by Palaniappa et al. and Jae Woo Kim et al. do not provide a continuous and/or uniform coating, thereby allowing electrolyte decomposition by the active electrode materials and preventing further improvement of the cycle life of the battery when applied to battery applications. As another example, the methods described in the prior art for coating polymers onto fine powders are not feasible for coating polyimide-type polymers onto Li-ion battery active materials. The solvent/non-solvent based process of Rowe for example, relies on the use of mineral silicates to prevent agglomeration of the polymer coated powder. Any particles that adhere to the surface of the polyimide may result in discontinuity of the final metal coating, because they cover the catalyst particles nucleated from the polyimide. Further, metal oxides, including silicates, may be electrochemically active inside a Li-ion battery, and could significantly reduce the first cycle columbic efficiency of the cell. The high temperature fluid-energy milling process disclosed in Smith-Johannsen et al. is also problematic, since the polymer must be molten in order to flow across the surface of the powder and uniformly coat it. When poly(amic acid) polymers pass above their glass transition temperature and are able to flow, they quickly undergo a chemical reaction to form polyimides which are brittle and do not flow until much higher temperatures. Additionally, the polyimide would need to be re-converted to the poly(amic acid) form via base hydrolysis in order to regain PM capturing ability, and such a treatment would likely dissolve the polymer coating from the substrate. Both of these processes require the significant use of solvents; those suitable for dissolving poly(amic acid), such as n-methylpyrrolidone, are typically hazardous and would result in increased safety risks and waste disposal costs compared to a polymer coating process which is predominately water-based.

The inventors herein have recognized that a PM catalyst will adhere more securely to an electrochemically active electrode powder when a polymer coating is applied to the powder. Therefore, the issues described above may be at least partially addressed by an electrochemically active electrode material comprising: a continuous polymer coating coupled directly to an exterior surface of the electrochemically active electrode material; a metal catalyst adhered to the continuous polymer coating for catalyzing an electroless deposition (ELD) reaction; and a continuous metal coating that completely covers the metal catalyst and continuous polymer coating. The metal catalyst may adhere more strongly to the polymer than the electrochemically active electrode material itself. Thus, the metal catalyst may populate the exterior surface of the electrochemically active electrode material more densely when the exterior surface of the active electrode material contains the continuous polymer coating than when the exterior surface of the active electrode material is bare and not coated with the polymer. In this way, a thinner, more continuous, even, and uniform conductive metal coating may be applied to the active electrode material during a subsequent ELD reaction.

As another example, the issues described above may be at least partially addressed by a coated electrochemically active electrode powder comprising: an electrochemically active electrode powder particle; a polymer coated directly onto an exterior surface of the electrochemically active electrode powder particle; a metal catalyst coupled to the polymer for catalyzing an electroless deposition (ELD) reaction; and a continuous metal coating that completely covers the metal catalyst and the polymer.

In yet another example, the issues described above may be at least partially addressed by a method for metallizing a powder particle of an electrochemically active electrode material comprising: coating an exterior surface of the powder particle with a continuous layer of a polymer; annealing/applying a catalyst for an electroless deposition (ELD) reaction onto the polymer; and depositing a continuous layer of a metal on the catalyst and polymer via electroless deposition.

Thus, by applying the polymer coating to the electrochemically active electrode material, adhesion of the metal plating catalyst to the fine, electrochemically active electrode powder may be increased, and therefore the areal site density of the metal plating catalyst on the electrochemically active electrode powder may be increased. This results in significantly lower sensitivity of the ELD process, simplifying development and production of new composite materials. Further, the metal coating are completely continuous metal coatings, exhibiting sufficiently low thickness (<150 nm) and uniform surface morphology. Because the coatings are more continuous and uniform, and because of how thin the metal conductive coatings can be made (due to the higher areal density of the metal catalyst) while maintaining a continuous and uniform surface morphology, the charge and discharge performance of batteries including electrochemically active materials having these coatings may be increased. Further, because the metal catalysts adhere to the electrochemically active material more when a polymer coating is first applied to the active material, less of the metal catalysts may need to be used, thereby reducing the cost of producing such metal-coated electrochemically active powders.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present disclosure relates to materials and methods for coating an electrochemically active electrode material, such as the graphite of an anode, with a polymer that adheres more readily to a metal plating catalyst (e.g., a metal catalyst for an ELD reaction) than the electrochemically active electrode material itself. By coating the active electrode material with the polymer, less of the metal plating catalyst may be needed to perform the metal plating reaction, and a greater amount of the catalyst may adhere to the active electrode material, thereby leading to a thinner, more continuous and/or uniform metal coating on the electrochemically active electrode material when the reaction (e.g., ELD reaction) is performed.

Figure 1A:
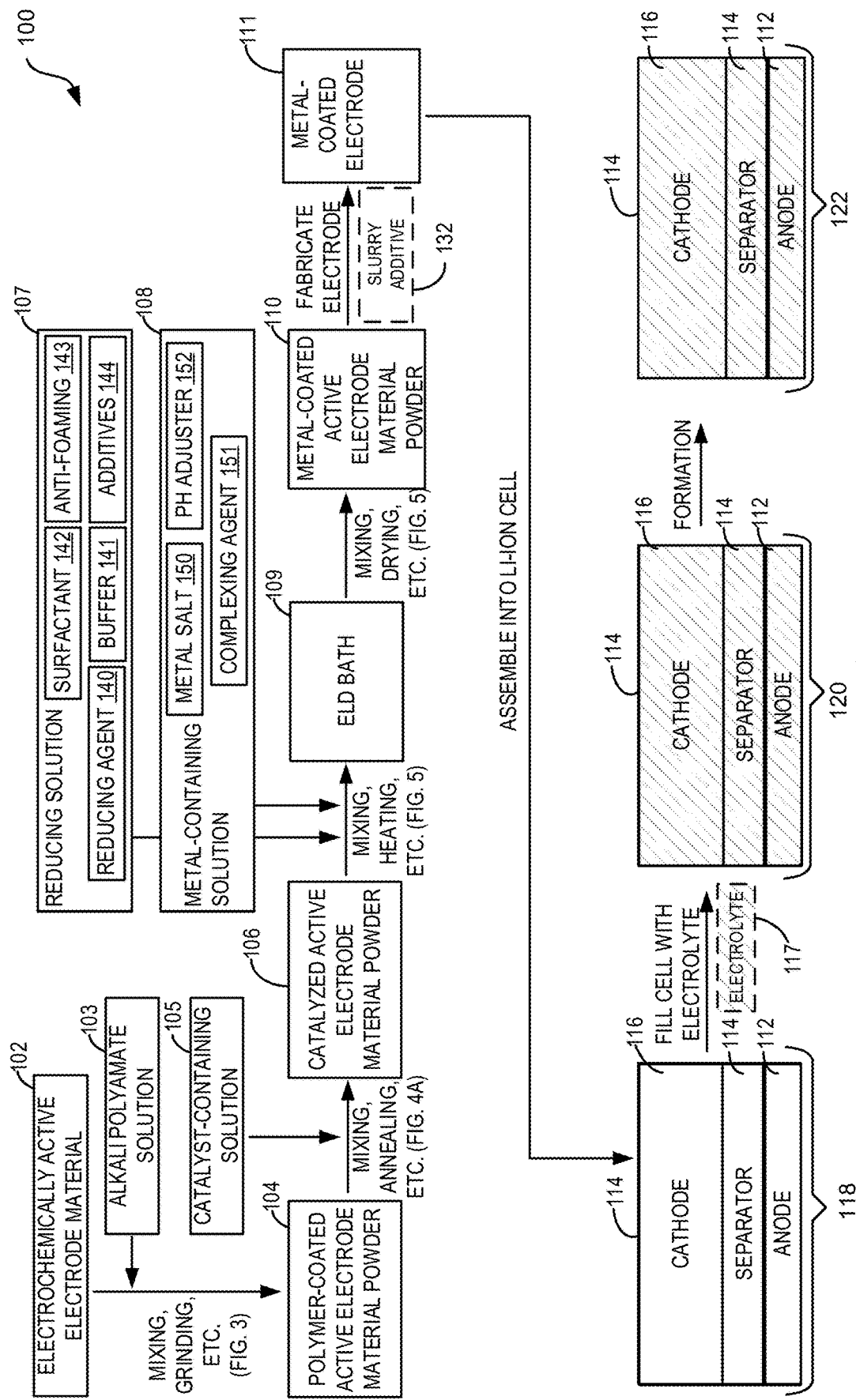
FIG. 1A shows a schematic of an example method for manufacturing a lithium-ion battery comprising an electrochemically active electrode material coated with a polymer and a metal, in accordance with at least one embodiment of the present disclosure.
Figure 1B:
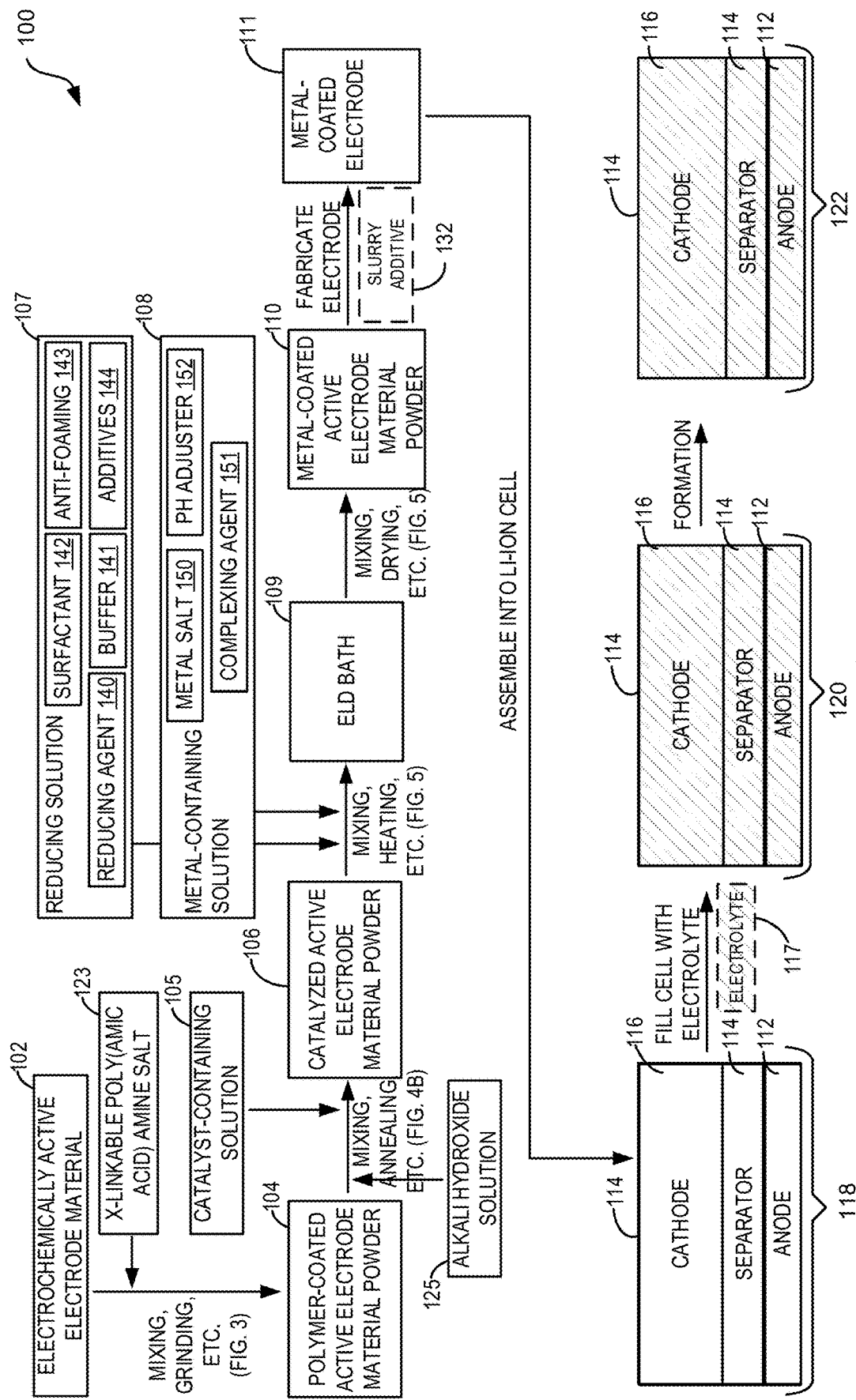
FIG. 1B shows a schematic of an example method for manufacturing a lithium-ion battery comprising an electrochemically active electrode material coated with a cross-linkable polymer and a metal, in accordance with at least one embodiment of the present disclosure.

As shown in the example of FIGS. 1A and 1B, a lithium-ion battery comprises electrodes, namely a negative electrode (anode) and a positive electrode (cathode). The electrodes are made from electrochemically active materials. For example, the anode may be constructed graphite, and the cathode may be constructed from a high nickel active cathode material such as lithium nickel manganese cobalt oxide ($LiNi_xMn_yCo_{1-x-y}O_2$ or NMC).

The electrochemically active electrode materials may be in the form of a powder and may comprise porous secondary particles as shown in the example SEM image of a sample of graphite MesoCarbon MicroBeads (MCMBs). As described in the example metallization method of FIG. 2, the active electrode materials may be coated with a polymer and a catalyst for an ELD reaction may be applied to the polymer coating. This ELD catalyst may then be used to catalyze an ELD reaction which deposits a metal coating on top of the polymer coating. FIG. 3 shows an example method for coating the polymer on the active electrode material. The polymer may comprise many different compounds. FIGS. 1A, 1B, 4A, and 4B show various methods for applying the catalyst to different types of polymer coatings. Once the polymer and catalyst have been applied to the active electrode material, a metal may be coated onto the active electrode material using an ELD reaction, as described in the example method of FIG. 5.

Figure 8:
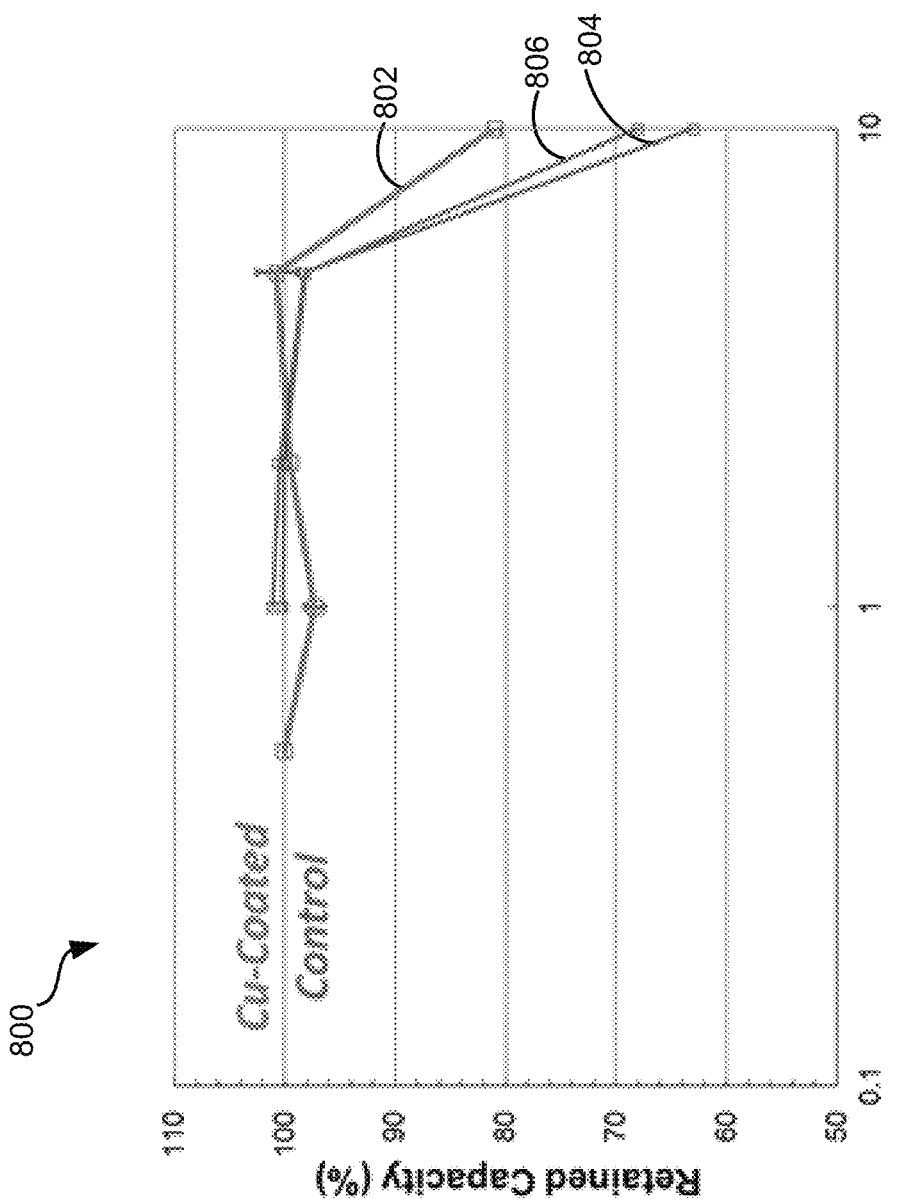
FIG. 8 shows a graph of example test data comparing the measured retention capacity at varying C-rates for lithium-ion cells comprising electrodes manufactured in accordance with at least one embodiment of the present disclosure, the electrodes comprising electrochemically active materials coated with a polymer and a metal, relative to lithium-ion cells comprising uncoated electrodes.

Through experimentation and testing, the metal coated active electrode materials comprising the polymer intermediary have more continuous and/or uniform metal coatings while also having greater capacity retentions than other metal coated active electrode materials that do not comprise a polymer layer and rely on nucleation of the precious metal catalysts on the surface of the substrate. For example, FIGS. 6B-6F show SEM images illustrating how much more continuous and uniform the metal coatings of polymer-coated active electrode materials are than active electrode materials lacking the polymer coating. Further, FIG. 8 shows example test results reporting how the retained capacity of battery cells comprising the polymer-coated active electrode materials is much greater at higher C-rates than other active electrode materials. Further, the thickness of the coating may be maintained sufficiently low (e.g., <150 nm) such that the volumetric capacity of the battery cell is not negatively affected.

Thus, the performance of a battery cell may be improved by more completely and uniformly covering the electrode active materials with a conductive metal that encourages lithium-ion transport. Specifically, by more continuously and uniformly covering the electrode active materials with a conductive metal such as copper, a greater high-rate discharge capability may be achieved. Further, this greater high-rate discharge capability may be achieved without sacrificing the volumetric capacity of the battery cell, because the coating may be kept relatively thin. In particular, because the catalyst may more readily adhere to the polymer than the electrochemically active electrode material itself, the areal site density of the catalyst on the surface of the active electrode material may be increased. Because the areal site density of the catalyst may be increased, the amount of metal coating needed to fill in the gaps between adjacent catalyst islands is reduced, and therefore the thickness of the metal coating needed to form a completely continuous coating may be reduced.

Further, the polymer-coated electrode materials may increase the safety of the battery cells into which they are incorporated because they enable a more continuous and/or uniform metal coating to be applied onto the secondary particles of the active material powder. By more completely covering the active electrode materials with a thin metal film, the interaction with, and therefore decomposition of, the electrolyte by the active electrode materials may be minimized, thereby increasing the flash point of the battery cells.

For purposes of clarity and continuity it should be appreciated that in the following description, multiple different names may be used to refer to the same concept, idea, or item, and vice versa. For example, it should be understood that "active electrode materials" may be used herein to refer to all electrochemically active electrode powders used in lithium-ion batteries including, but not limited to, graphite, graphite MesoCarbon Microbeads (MCMBs), LiCoO2, LiMn2O4, and LiFePO4, lithium nickel manganese cobalt oxide (NMC), etc.

Further, although the present disclosure is primarily concerned with metal plating electrochemically active materials via ELD reactions, it should be appreciated that other metal plating techniques may be used without departing from the scope of this disclosure. Correspondingly, although the present disclosure is primarily concerned with suitable catalyst for ELD reactions (e.g., precious metals) it should be appreciated that other catalysts may be used without departing from the scope of this disclosure. For example, one or more of: platinum group metals (platinum, palladium, ruthenium, rhodium, iridium, rhenium), as well as gold and silver may be used as catalysts for any one or more of the metal plating techniques described above. Additionally, any metal that could be plated using ELD could be used as a catalyst (such as copper, nickel, cobalt, iron, etc.).

Additionally in the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" or "a mixture of" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Turning to FIGS. 1A and 1B, they show schematics of different example processes for fabricating an electrode for a lithium-ion battery comprising an electrochemically active material having a layered coating of a polymer and a conductive metal. In particular, FIG. 1A shows an example method for fabricating a lithium-ion battery, wherein the polymer of the active material's coating comprises a polymer that is not cross-linkable, whereas FIG. 1B shows a similar method, but for a polymer that is cross-linkable. The differences in the two process described in FIGS. 1A and 1B are elaborated in greater detail below with respect to FIGS. 4A and 4B.

Focusing on FIG. 1A, it shows a schematic 100 of example method for fabricating a lithium-ion battery including an electrochemically active material that comprises a coating of conductive metal on top of a coating of a polymer that is not cross-linkable. An electrochemically active electrode material 102, may first be mixed with a solution that contains the polymer that is not cross-linkable (e.g., alkali polyamate solution 103).

In a preferred embodiment, the active electrode material 102 may comprise the electrochemically active material of an anode. For example, the active electrode material 102 may comprise graphite and/or graphite MCMBs, other forms of carbon such as hard carbon, elements capable of alloying with Li (e.g., silicon, tin, antimony, or compounds of the same). However, in other examples, the active electrode material 102 may comprise the electrochemically active material of a cathode such as LiCoO2, LiMn2O4, and LiFePO4, lithium nickel manganese cobalt oxide (NMC), etc.

The alkali polyamate solution 103 may comprise an aromatic polyimide (e.g., lithium polyamate salt) dissolved in a solvent (e.g., water). Thus, the alkali polyamate solution 103 may be prepared by first synthesizing a polymer, such as an aromatic poly(amic acid), and then dissolving that synthesized polymer in a solvent. The polymer in the solution 103 be highly soluble in the solvent of solution 103 (e.g., water), may have a relatively low molecular weight (<100 kDa), may comprise a chemical structure with a high energy barrier to rotation about the main chain, may have a substantial ability to chelate precious metal (PM) ions, may be capable of reducing chelated PM ions to metallic nanoparticles via low-temperature thermal treatment, preferably in an atmosphere of air, may be completely insoluble in water after thermal treatment, and may have high electronic and ionic conductivity when used as a component of a lithium-ion battery.

Thus, the polymer of the alkali polyamate solution 103 may comprise an aromatic poly(amic acid), which consists of alternating monomer units of a diamine and a dianhydride. When thermally treated, the poly(amic acid) converts to an aromatic polyimide. The table below provides examples of some suitable monomers for use in the polymer of the alkali polyamate solution 103.

| Dianhydrides | Diamines |
| --- | --- |
| 1,4,5,8-Naphthalenetetracarboxylic dianhydride | 4,4'-Diaminobenzophenone |
| 1,4-Benzoquinonetetracarboxylic dianhydride | 4,4'-Oxydianiline |
| 3,3',4,4'-Biphenyltetracarboxylic dianhydride | Benzene-1,4-diamine |
| 4,4'-Oxydiphthalic anhydride | Naphthalene-2,6-diamine |
| Benzophenone-3,3',4,4'-tetracarboxylic dianhydride | |
| Pyromellitic dianhydride | |

To synthesize the lithium polyamate salt of the alkali polyamate solution 103, the poly(amic acid) may first be synthesized and then heat treated. To synthesize the poly(amic acid) polymer the diamine and dianhydride monomers may be reacted at approximately a 1:1 ratio in a suitable solvent, such as N-Methyl-2-pyrrolidone (NMP), for between 1-8 hours at a temperature of between about 40-80° C. The concentration of polymer in the solution may be between 5-30 wt %, and most preferably about 20 wt %. This reaction may be carried out under an inert atmosphere such as nitrogen or argon. The molecular weight of the polymer may be controlled by varying the time and temperature of the reaction, as well as the purity and ratio of the reactants. In order to give the poly(amic acid) PM chelating ability, the free carboxylic acid groups may be neutralized with a base, preferably an alkali metal hydroxide, and most preferably lithium hydroxide. Because the alkali neutralized poly(amic acid) is highly water soluble, the poly(amic acid) cannot be neutralized after it is coated onto the powder, otherwise the polymer coating may fully dissolve into the solution. Therefore, an aqueous solution of lithium hydroxide may be slowly added to the NMP solution of poly(amic acid) and mixed for between 10-60 minutes and heat treated at a temperature of between 50-100° C. The lithium polyamate salt may then be separated from the solvent via a condenser technique like rotary evaporation. The lithium polyamate salt may also be separated by adding a non-solvent that is miscible with the solvent in order to precipitate the lithium polyamate salt, followed by filtration to remove the solvent from the precipitate.

The lithium polyamate salt may then be dissolved in a solvent (e.g., water) to form the lithium polyamate solution 103. The polymer of the alkali polyamate solution 103 increases the uniform nucleation and adhesion of catalyst particles to the active electrode material 102. Thus, the alkali polyamate solution 103 may be mixed with the active electrode material 102 to form a thin polymer layer on the electrode material 102. As will be described in greater detail below with reference to FIG. 3, the alkali polyamate solution 103 and active electrode material 102 may be mixed, dried, etc., until the polymer in the alkali polyamate solution 103 is deposited on the active electrode material 102 such that it continuously coats the active electrode material 102. When drying, the polymer-coated active electrode material may agglomerate to form macroscopic particles. Thus, after drying of the active electrode material 102 and lithium polyamate solution 103, the resulting particles may be ground to powder, resulting in a polymer-coated active electrode material powder 104.

The active electrode material powder 104 may comprise at least one (e.g., a plurality of) fine powder particles. These powder particles may comprise secondary particles, the secondary particles composed of a plurality of primary particles. In particular, secondary particles may be agglomerations of chemically bound, nanometer sized primary particles. Primary particles by contrast, are fundamental particles held together by atomic or molecular bonding that can only be separated into smaller particles by the application of ultrahigh energy. Primary particles, therefore may be much smaller than the secondary particles. For example, primary particles may be roughly 1 μm or less in diameter, whereas secondary particles of the active electrode material powder may be greater than 1 μm diameter, and may increase in size up to many tens of microns in diameter. Example secondary particles of electrochemically active electrode material powders are shown and described in greater detail below with reference to FIGS. 6A-6F.

A catalyst-containing solution 105 may then be mixed with the polymer-coated active electrode material powder 104 to apply a conductive metal catalyst to the powder 104 as described in greater detail below with reference to FIG. 4A, resulting in a catalyzed active electrode material powder 106. The catalyst-containing solution 105 may comprise a metal that may be used as a catalyst in an ELD reaction, dissolved in a solvent. For example, the metal may comprise a precious metal such as palladium, rhodium, gold, silver, and platinum. In a preferred embodiment, the catalyst-containing solution 105 may comprise a silver nitrate aqueous solution and the metal catalyst for the ELD reaction may comprise silver. However, it should be appreciated that the catalyst-containing solution 105 may comprise any soluble silver salt.

Thus, the metal catalyst may anneal to the polymer of the polymer-coated active electrode material powder. The catalyzed active electrode material powder 106, therefore comprises the same polymer coating as the polymer-coated active electrode material powder 104, except that the powder 104 may also include the metal catalyst from the catalyst-containing solution 105. As will be described in greater detail below with reference to FIG. 5, a conductive metal, such as copper, may then be deposited and/or coated onto the catalyzed active electrode material powder via an ELD reaction. This may comprise mixing the catalyzed active electrode material powder 106 with one or more of a reducing solution 107 and a metal-containing solution 108 to form an ELD bath 109 (also referred to herein as "plating bath 109"). The ELD reaction may proceed in the ELD bath 109, whereby the metal catalyst from the catalyst-containing solution 105 may catalyze the deposition of metal in the metal-containing solution 108 onto the electrode material powder.

As will be described in greater detail below with reference to FIG. 5, the reducing solution may be mixed with the catalyzed active electrode material powder 106 first, and then the metal-containing solution 108 may be added in slowly thereafter. The reducing solution 107 may comprise one or more of a reducing agent 140, a buffer 141 consisting of a weak acid and a weak base, a polymeric surfactant 142, an anti-foaming agent 143, and additives 144 to control growth properties of the metal deposit.

The reducing agent 140 in general must be stable enough to avoid spontaneous decomposition of the ELD bath 109, but reactive enough that the ELD reaction occurs at a sufficiently high rate to reduce essentially all of the soluble metal salt after a reasonable amount of time.

The reducing agent 140 is selected depending on the metal(s) being deposited, since the catalytic activity of each metal or alloy is different for different reducing agents. For example the reducing agent 140 may comprise one or more of aldehydes such as formaldehyde and glyoxylic acid, hydrazine, sodium hypophosphite, amine complexes of borane including ammonia borane and dimethylamine borane, and sodium borohydride. The concentration of the reducing agent 140 in the reducing solution 107 is typically between a 25-100% excess of the stoichiometric amount needed to reduce all of the metal salts added to metallic form, which may be in the range of 0.10-0.50 molar.

The buffer 141 may be a mixture of a weak acid and a weak base, and may be necessary to prevent the pH of the ELD bath 109 from changing significantly during course of ELD reaction. The pH of the ELD bath 109 depends on the reducing agent, and may be chosen to maximize the reaction rate. The ELD bath 109 may be alkaline with a pH ranging between about 9.0-13.0, although certain reducing agents such as sodium hypophosphite may alternatively be used in an acidic plating bath with a pH between about 3.0-6.0. Because some polyimides are susceptible to hydrolysis in alkaline solutions, the pH may be maintained below 11 in in example where the polymer coating comprises a polyimide to prevent the polyimide from dissolving in the ELD bath 109. The acid used in the buffer 141 may comprise a carboxylic acid such as formic acid, acetic acid, citric acid, or the like, and the base may comprise ammonia or an organic amine. However in other examples where a pH of more than 11 is desired, then an alkali hydroxide such as sodium hydroxide may be added to raise the pH. For an alkaline plating bath, the base may be added in a concentration of between 0.25-2.0M in the reducing solution 107, and the acid may be added while measuring the pH until the pH stabilizes at the desired value; for an acidic plating bath the inverse may be performed.

The plating bath 109 may additionally contain the surfactant 142 in order to enable wetting of hydrophobic materials such as carbon, and also to prevent agglomeration of particles during the ELD reaction. Due to the evolution of hydrogen gas from the oxidation of most suitable reducing agents, a surfactant that causes foaming is undesirable and potentially unsafe. Therefore, suitable surfactants are generally polymers with a molecular weight of about 2.5 to 25 kDa, which contain functionalities that coordinate to the surface of the metal. Examples of such polymers include poly(ethylene glycol), poly (vinyl alcohol), and poly(vinyl pyrrolidone). The concentration of the surfactant in the reducing solution 107 may be between 5-25 g/L.

Anti-foaming agent 143 may be added in conjunction with the surfactant 142 in order to prevent the evolved hydrogen gas evolved from causing excessive foaming, which could be an explosion risk. The anti-foaming agent 143 may comprise an aliphatic alcohol such as methanol, ethanol, or isopropanol, and may be present at a concentration in the reducing solution 107 between 50-250 mL/L.

In order to control the properties of the deposited metal film, in particular surface morphology, grain size, and impurity concentration, additives 144 may be employed in a concentration range in the reducing solution 107 between 1-50 parts per million. In a preferred embodiment, a two additive system in which one additive increases the rate of deposition (an "accelerator") and one additive decreases the rate of deposition (a "suppressor") may be utilized. The accelerator and suppressor must be chosen such that the relative adsorption of the suppressor versus the accelerator increases as the potential on the metal surface becomes more negative. This has the effect of reducing the overpotential in less negative areas of the metal surface, and increasing the overpotential in more negative areas, which substantially prevents nodular growth of the metal film and significantly improves the uniformity of the surface morphology.

The metal-containing solution 108 comprises the metal to be coated on the electrode material powder 106 during the ELD reaction. More specifically, the metal-containing solution 108 may comprise one or more of: soluble metal salts 150 of the metal or metals to be deposited, a complexing agent 151 to chelate the metal salts 150, and a pH adjuster 152.

The soluble metal salts 150 may comprise one or more of the following metals: titanium, vanadium, chromium, manganese, iron, cobalt, nickel, copper, zinc, zirconium, tungsten, molybdenum, tin, antimony, lead, and bismuth. The metal salts 150 may be in the form of the sulfate, nitrate, chloride, acetate, or any other compound which is commercially available, readily soluble in water, and does not undergo any unwanted reactions in the ELD bath 109. In a preferred embodiment, the concentration of the metal salts 150 may be as high as possible in order to reduce the total volume of the solution; depending on the solubility of the metal salts 150 the concentration may range between 0.25-1.50 molar in the metal-containing solution 108.

The complexing agent 151 in the metal-containing solution 108 may prevent the metal salts 150 from precipitating as a hydroxide at high pH, and may prevent spontaneous decomposition of the ELD bath 109. The complexing agent 151 may comprise polydentate carboxylic acids or amines, but the most preferable complexing agent to use depends on the metal salts present and the required pH. For example, the complexing agent 151 may comprise one or more of tartaric acid, citric acid, ethylenediamine, ethylenediamine tetraacetic acid (EDTA), and thiourea. The concentration of the complexing agent may range between 10-25% in excess of the stoichiometric amount required to form the metal-ligand complex. For example, in a solution containing 0.50M Copper(II) Sulfate, between 0.55-0.625M EDTA or between 1.1-1.25M tartaric acid may be used.

The pH adjuster 152 is added to the metal-containing solution 108 to achieve the same pH as the reducing solution 107. If the reducing solution is acidic, a weak acid such as citric acid or acetic acid may be used. If the reducing solution 107 is basic, either an amine such as ammonia, or an alkali hydroxide such as sodium hydroxide may be used. The amount of pH adjuster 152 used may depend on the structure and concentration of the complexing agent 151, as well as the target pH. The concentration of the pH adjustor may range between 0.1-1.0 molar in the metal-containing solution 108. The ELD reaction and process for coating the catalyzed active electrode material powder 106 with the conductive metal may be described in greater detail below with reference to FIG. 5.

Continuing with FIG. 1A, the ELD reaction proceeds in the ELD bath 109, and the conductive metal from the metal-containing solution 108 coats the catalyzed active electrode material powder 106. The liquid in the bath 109 may then be evaporated off, leaving a metal coated active electrode material powder 110, coated with a continuous layer of the metal from the metal-containing solution 108. Examples of the metal-coated active electrode material powder 110 are shown and described below in the SEM images of FIGS. 6E and 6F.

After coating the electrode material powder with the polymer from the alkali polyamate solution 103 and the metal from the metal-containing solution 108, the metal-coated active electrode material powder 110 may then be fabricated into an electrode 111 comprising the metal-coated active electrode material powder 110. Prior to fabricating the electrode 111, the metal-coated active electrode material powder 110 may be pre-mixed with one or more conductive additives and/or binders. Fabricating of the electrode 111 may comprise mixing the metal-coated active electrode material powder 110 into a slurry with the conductive additives and/or binders, coating the slurry onto a conductive substrate, drying the slurry-coated conductive substrate, compressing the coating, and calendering. For example, the metal-coated active electrode material powder 110 may be mixed with one or more slurry additives 132 to form the slurry. In particular, the slurry additives 132 may comprise one or more solvents and/or bindings agents such as a polymeric binder. As another example, the metal-coated active electrode material powder 110 may be mixed with a binder and at least one additive in a non-aqueous solvent to form the slurry. The slurry containing the metal-coated active electrode material powder 110 may then be coated onto a conductive substrate (also referred to herein as a "current collector") such as a metal foil (e.g., copper foil, lithium foil, aluminum foil, etc.), which may then be dried, pressed, and calendared to form the electrode 111.

The electrode 111 comprising the metal-coated active electrode material powder 110 may then be fabricated into a lithium-ion cell 118, by assembling the electrode 108 with another electrode and a separator 114. In some examples, only one of the metal-coated electrodes 111 may be used to fabricate the lithium-ion cell 118. In such examples, the electrode 111 may be fabricated with an electrode of the opposite polarity. For example, if the metal-coated electrode comprises an anode (e.g., comprises graphite as the electrochemically active material) then a cathode may be used in conjunction with the electrode 111 to form the cell 118. Conversely, if the electrode 111 is fabricated as a cathode (e.g., the electrochemically active material of the metal-coated active electrode material powder 110 comprises one or more of: $LiCoO_2$, $LiMn_2O_4$, and $LiFePO_4$, lithium nickel manganese cobalt oxide (NMC), etc.) then the electrode 111 may be used in conjunction with an anode to fabricate the cell 118. In yet further examples, two metal coated electrodes 111 of opposite polarity may be fabricated and used to form the lithium-ion cell 118.

The separator 114 serves to separate anode 112 and cathode 116 so as to avoid their physical contact. In a preferred embodiment, the separator 114 has high porosity, excellent stability against the electrolytic solution, and excellent liquid holding properties. Example materials for the separator 114 may be selected from nonwoven fabric or porous film made of polyolefins, such as polyethylene and polypropylene, or ceramic coated materials.

The Li-ion cell 118 may then be filled with electrolyte 117 (indicated by the hashed lines in FIG. 1A), to produce a filled Li-ion cell 120. The Li-ion cell 118 may further comprise a housing 114, such as a pouch, that houses the anode 112, cathode 116, separator 114, and electrolyte 117. The housing 114 may be sealed when finishing the cell 118 so that the electrolyte 117 is contained within the housing 114.

The electrolyte 117 is in intimate contact with the components in the Li-ion cell 120, as illustrated. The electrolyte 117 may comprise Li salt, organic solvents, such as organic carbonates, and additives. The electrolyte 117 is present throughout the Li-ion cell and in physical contact with the anode 112, cathode 116, and separator 114.

The filled Li-ion cell 120 may then undergo cell formation, referred to also as a first charge/discharge cycle, to form Li-ion cell 122. Li-ion cell 122 may be a fully fabricated and complete battery cell that is ready for insertion or use in a Li-ion battery in conjunction with other similarly finished Li-ion cells.

Further, during cell formation other reactions, for example additive reactions, may occur. In some embodiments, heat treatment of the Li-ion cell during cell formation may be performed. Heat treatment may affect the kinetics of the battery components reactions. For example, the cells may be exposed to temperatures between 30° C. to 100° C., such as 35° C., 45° C., 60° C., 80° C., or 100° C., for a period of time between 30 minutes to 7 days.

In this way, a lithium-ion battery may be fabricated wherein an electrochemically active material is coated with a polymer and a conductive metal and used to form an electrode of at least one battery cell of the lithium-ion battery. In particular, the lithium-ion battery may include one or more battery cells, wherein one or more of the battery cells include a separator, an electrolyte, and two electrodes (an anode and a cathode), wherein at least one of the electrode contains the electrochemically active material having a layered polymer and conductive metal coating.

Turning now to FIG. 1B, it shows another example schematic 100 that is similar to the example schematic and method of FIG. 1A, except that the polymer used in the example of FIG. 1B to coat the electrochemically active electrode material 102 may comprise a cross-linkable poly(amic acid) amine salt. Thus, the schematic 100 simply shows another method for forming the metal-coated electrode 111 using a different polymer (e.g., not a lithium polyamate salt) than discussed above in FIG. 1A.

Thus, instead of a polymer that is not cross-linkable as is described above in FIG. 1A, FIG. 1B provides a method for fabricating the metal-coated electrode 111 using a cross-linkable poly(amic acid) amine salt 123. Thus, the polyimide in FIG. 1B is crosslinked, preferably by a low temperature thermal treatment, in order to increase its electronic conductivity and prevent it from dissolving in highly alkaline solutions. The crosslinking agent may be a mono-functional monomer capable of terminating (end-cap) the polymer chain, such as an aromatic carboxylic acid anhydride or an aromatic amine. The crosslinking agent must also contain an alkyne which is conjugated to one or more aromatic rings, including the aromatic ring connected to the amine or anhydride. An example of a suitable crosslinking agent is 4-phenylethynylphthalic anhydride (PEPA). The crosslinking agent may be added at a molar ratio of between 1:20 and 1:100 with respect to the total moles of monomer in the polymer. If the crosslinking agent is an amine, one equivalent less of the diamine monomer may be added; if it is an anhydride, one equivalent less of the dianhydride monomer may be added. For example, if the crosslinking agent is PEPA and a crosslinking ratio of 1:50 is used, then the monomer mixture is 1 part PEPA, 25 parts of a diamine, and 24 parts of a dianhydride. Adding an end-capping crosslinking agent may significantly reduce the molecular weight of the resulting polymer. It may be necessary to ensure that the molecular weight of the polymer is above the critical molecular weight for entanglements, otherwise the polymer coating is likely to be discontinuous. Therefore, it may be preferable to use a crosslinking ratio between about 1:30 and 1:50.

The synthesis procedure for the crosslinked poly(amic acid) is analogous to that of the un-crosslinked polymer described above in FIG. 1A, except that instead of neutralizing the poly(amic acid) with an alkali hydroxide, it is neutralized with an organic amine such as diethanolamine or triethylamine. The resulting amine salt of the thermally cross-linkable poly(amic acid) is water soluble, and can be coated onto the powder using the same process. After the polymer is coated, it must be thermally crosslinked by heating to a temperature of between 350-425° C. for between 15-60 minutes, which may be done either in air or an inert atmosphere such as argon or nitrogen. After cooling, the crosslinked polyimide coated powder is mixed with an alkali hydroxide solution 125, preferably lithium or sodium hydroxide, for between 10-60 minutes. The alkali hydroxide solution 125 may comprise a hydroxide concentration of between 0.5-2.5 molar, and may be heated to a temperature of between 40-80° C. The powder is subsequently removed the mixture by filtration and washed with several additions of deionized water to remove any excess hydroxide. The powder is then mixed with the catalyst-containing solution 105 and heated analogously to the powder utilized the un-crosslinked polyimide to form the catalyzed active electrode material powder 106, as will be described in greater detail below with reference to FIG. 4B.

Figure 2:
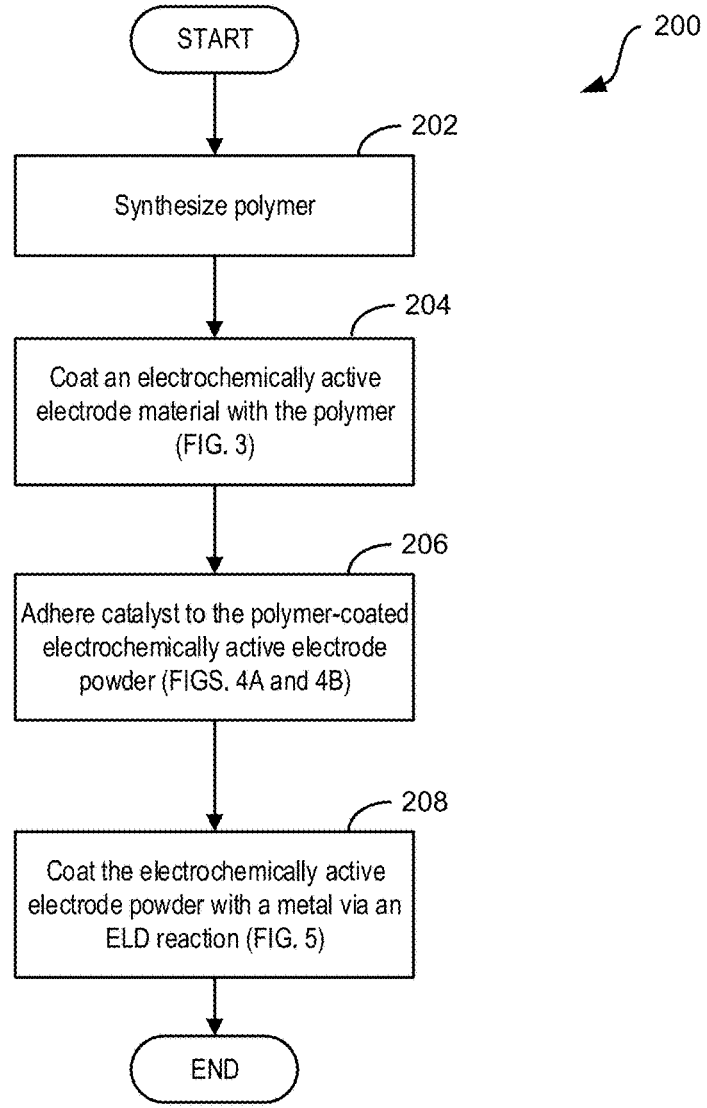
FIG. 2 shows a flow chart of an example method for metallizing an electrochemically active electrode material of a battery, such as the lithium-ion battery of FIG. 1A and/or FIG. 1B, by applying a polymer coating to the electrochemically active electrode material before depositing a metal coating on the electrode material, in accordance with at least one embodiment of the present disclosure.
Figure 3:
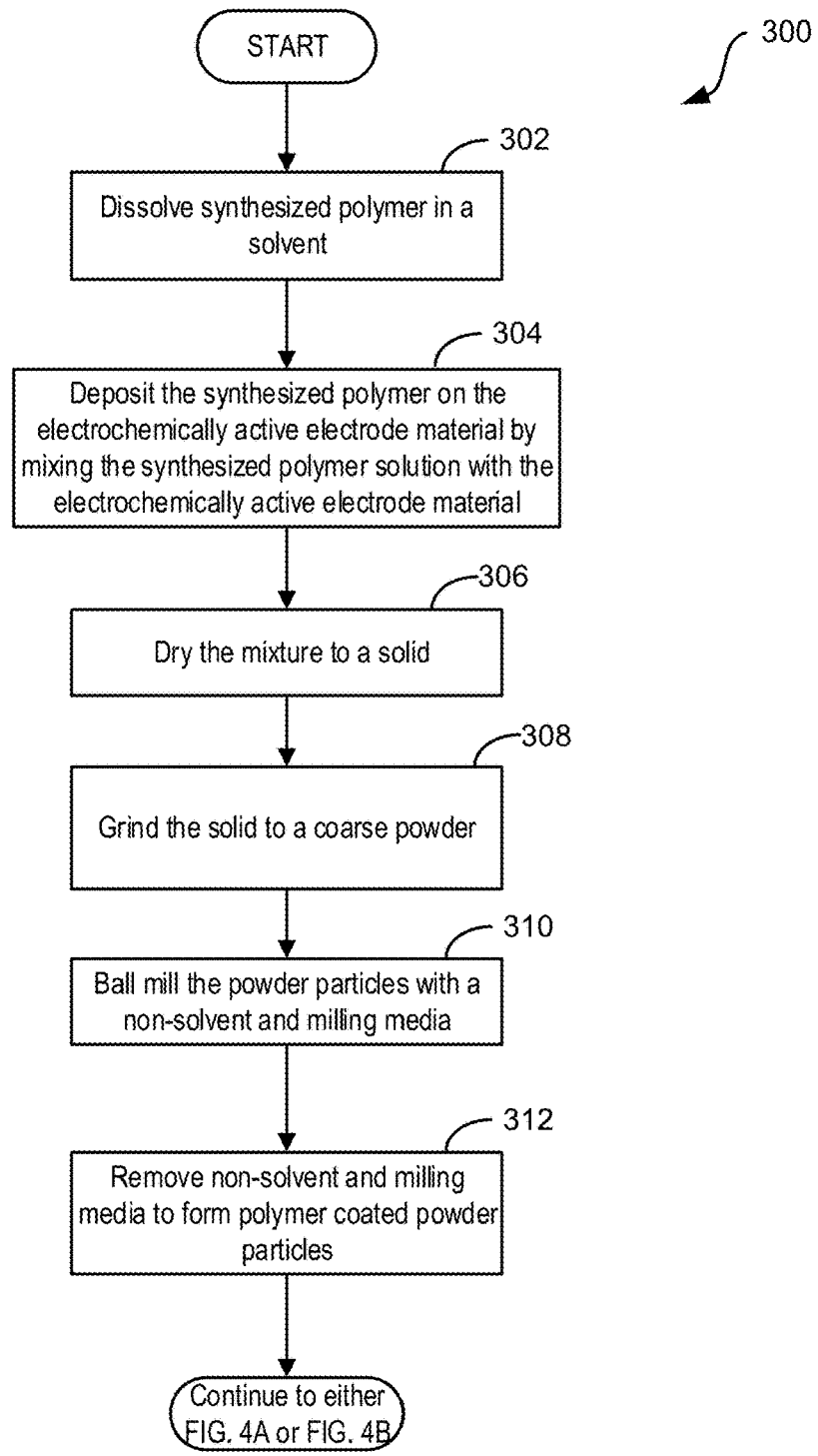
FIG. 3 shows a flow chart of an example method for coating an electrochemically active electrode material with a polymer, in accordance with at least one embodiment of the present disclosure.

Turning to FIG. 2, it shows a flow chart of an example method 200 for metallizing (e.g., metal plating) an electrochemically active electrode material (e.g., electrochemically active electrode material 102 described above in FIGS. 1A and 1B). Thus, the method 200 gives a general overview of example approaches for coating an electrochemically active electrode material with a conductive metal such as copper.

Method 200 begins at 202 which comprises synthesizing a polymer in the same or similar manner as described above in FIGS. 1A and 1B. Thus, the polymer may comprise one or more of: a cross-linkable poly(amic acid) amine salt, an aromatic poly(amic acid), an aromatic polyimide, lithium polyamate, and any other aromatic polyimide-type polymers. As described above in FIGS. 1A and 1B, different synthesis procedures may be used when synthesizing the cross-linkable poly(amic acid) amine salt than the lithium polyamate salt. The synthesized polymer may then be coated onto an electrochemically active electrode material at 204. In particular, the synthesized polymer may be dissolved in a solvent and then mixed with the electrochemically active electrode as will be described in greater detail below with reference to FIG. 3. The polymer coating may be continuous such that it completely covers an exterior surface of the powder particles of the electrochemically active electrode material.

Then at 206, a catalyst may be adhered to the polymer-coated electrochemically active electrode powder (e.g., polymer-coated active electrode powder 104 described above in FIGS. 1A and 1B) as will be described in greater detail below with reference to FIG. 4. The catalyst may comprise a metal catalyst for an ELD reaction, for example. Once the ELD catalyst has adhered to the polymer-coated electrochemically active electrode powder, the ELD reaction may proceed. Thus at 208, the electrochemically active electrode powder may be coated with a conductive metal via and ELD reaction. The flow chart in FIG. 5, provides more details on an example method for plating the active electrode powder with a conducting metal (e.g., carrying out an ELD reaction). Method 200 then ends.

Turning to FIG. 3, it shows a flow chart of an example method 300 for applying a polymer coating onto an electrochemically active electrode material (e.g., electrochemically active electrode material 102 described above in FIGS. 1A and 1B). Method 300 begins at 302 which comprises dissolving a synthesized polymer (e.g., lithium polyamate salt, cross-linkable poly(amic acid) amine salt, etc.) in a solvent. In one example, the solvent may comprise water. In particular, the polymer may dissolved in deionized water at a concentration between about 0.5-5.0 wt %, depending on the amount to be coated onto the powder. The method 300 may then continue from 302 to 304 which comprises depositing the synthesized polymer on the electrochemically active electrode material by mixing the synthesized polymer solution with the electrochemically active electrode material. In particular, the polymer solution (e.g., alkali polyamate solution 103 described above in FIG. 1A and/or cross-linkable poly(amic acid) amine salt described above in FIG. 1B) is mixed with the active material powder using a high shear mixer in order to fully disperse the powder in the polymer solution, resulting in an aqueous slurry with a solid loading of between 40-70 wt %. In a preferred embodiment the solid loading may be kept as high as possible while still completely dispersing the powder. The overall loading of the polymer (e.g., lithium polyamate) on the powder may be between 1.0-5.0 wt %, and more preferably between 2.0-3.0 wt %, depending on the geometry and surface area of the powder. It may be preferable to apply as little polymer (e.g., lithium polyamate) as possible while still achieving a continuous polymer coating.

The resulting mixture/slurry is subsequently dried to a solid at 306. As one example, the polymer solution and electrochemically active electrode material mixture/slurry may be dried under vacuum at a temperature of between 60-100° C. After drying, the resulting solid comprising the electrochemically active electrode material coated with the synthesized polymer is ground to a coarse powder at 308. In one example the solid may be ground to a particle size no larger than 0.5 mm, and preferably between 0.1-0.5 mm. The powder particles may then be ball milled with a non-solvent at 310. In particular, the coarse powder, non-solvent, and milling media may be loaded into a rotary ball milling chamber. The purpose of the non-solvent is to swell and plasticize the polymer (e.g., lithium polyamate), allowing it to be evenly disperse onto the surface of the powder via mechanical milling while avoiding agglomeration of the powder. Suitable non-solvents are preferably low molecular weight, polar, aprotic, organic solvents such as esters, ketones, or carbonates. For example, the non-solvent may comprise acetone since it is the lowest molecular weight ketone, and it is inexpensive and readily available. The milling media preferably has a spherical shape with a diameter of between 1-10 mm, and most preferably a diameter of about 5 mm. The milling media is preferably made of a high density material that is durable and non-reactive towards the components being milled.

The powder may comprise between about 10-30% of the volume of the milling chamber, while the milling media may comprise between about 20-50% of the volume. The non-solvent may be added such that the resulting slurry is between about 25-50% solids by weight, not including the weight of the milling media. About 20-50% of the milling chamber may remain unfilled. The rotary mill is preferably operated at a speed of between 10-400 rpm, and most preferably between 50-200 rpm. The material may be milled for a duration of between 0.5-4.0 hours, until a thick slurry free of agglomeration is obtained.

The milling media and non-solvent may then be removed to form polymer coated powder particles (e.g., polymer-coated active electrode material powder 104 described above in FIGS. 1A and 1B) at 312. In particular, the milling media be separated from the slurry by passing the mixture across a screen that allows the slurry to pass through, but not the milling media. The desired solid is then removed from the non-solvent via filtration, resulting in a powder coated with lithium polyamate that is free of agglomerations. This powder may be additionally dried prior to further processing, preferentially under vacuum at a temperature of between 20-80° C. The powder particles coated with the lithium polyamate may comprise secondary particles, and the lithium polyamate coating may be continuous (covering the entire exterior surface of the secondary particles), relatively smooth, and substantially uniform in thickness. Method 300 then continues to either 402 of method 400 in FIG. 4A or 452 in method 450 of FIG. 4B once the secondary powder particles have been coated with the polymer coating. In particular, method 300 may continue to FIG. 4A if lithium polyamate is used as the polymer in the polymer coating, and method 300 may continue to FIG. 4B if a poly(amic acid) amine is used as the polymer in the polymer coating.

Figure 4A:
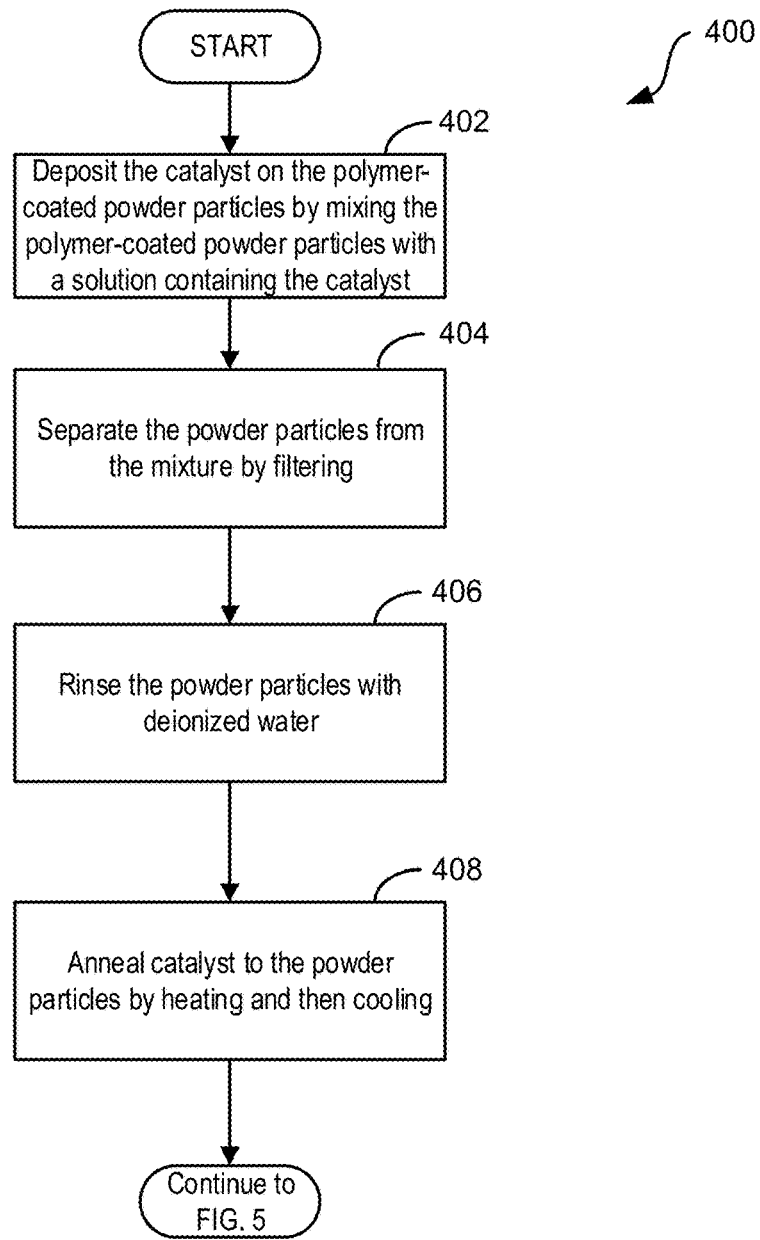
FIG. 4A shows a flow chart of an example method for applying a metal catalyst for an ELD reaction onto a polymer coating of an electrochemically active electrode material, in accordance with at least one embodiment of the present disclosure.

Continuing to FIG. 4A, it shows a method 400 for adhering a catalyst to a lithium polyamate coating on a polymer-coated electrochemically active electrode material powder (e.g., polymer-coated active electrode material powder 104).

Method 400 continues from 312 of method 300 in FIG. 3, and begins by depositing a catalyst on the polymer-coated powder particles by mixing the lithium polyamate-coated powder particles with a solution containing the catalyst (e.g., catalyst-containing solution 105 described above in FIGS. 1A and 1B). The catalyst may be a catalyst for an ELD reaction such as a precious metal comprising one or more of: palladium, platinum, rhodium, gold, silver, etc. In one example, the polymer-coated powder may be mixed with an aqueous solution of silver nitrate for between 5-30 minutes. The loading of the powder in the mixture may be between 5-25 wt %. In a preferred embodiment, the loading of the powder in the mixture may be 15 wt %. Silver nitrate may added in a 1:1 mole ratio corresponding to the free carboxylate groups in the lithium polyamate. The amount of silver nitrate needed may be calculated based on the molecular weight of the poly(amic acid) repeat units and the number of carboxylate groups per repeat unit. Depending on the loading of lithium polyamate on the powder and the loading of powder in the mixture, the concentration of silver nitrate may be between about 1-20 g/L.

Method 400 then continues from 402 to 404 after mixing the polymer-coated powder particles in the catalyst solution (e.g., silver nitrate solution). The method 400 at 404 comprises separating the powder particles from the mixture by filtering. Then at 406, the powder particles may be rinsed with several additions of deionized water until all excess silver nitrate has been removed. After rinsing at 406, method 400 may continue to 408 which comprises annealing the catalyst to the powder particles by heating and then cooling the powder particles. In one example, the powder particles may be heated in air to a temperature between 250-300° C. for between 15-60 minutes and may then be allowed to cool to room temperature before further processing. Method 400 then continues to 502 of method 500 in FIG. 5.

Figure 4B:
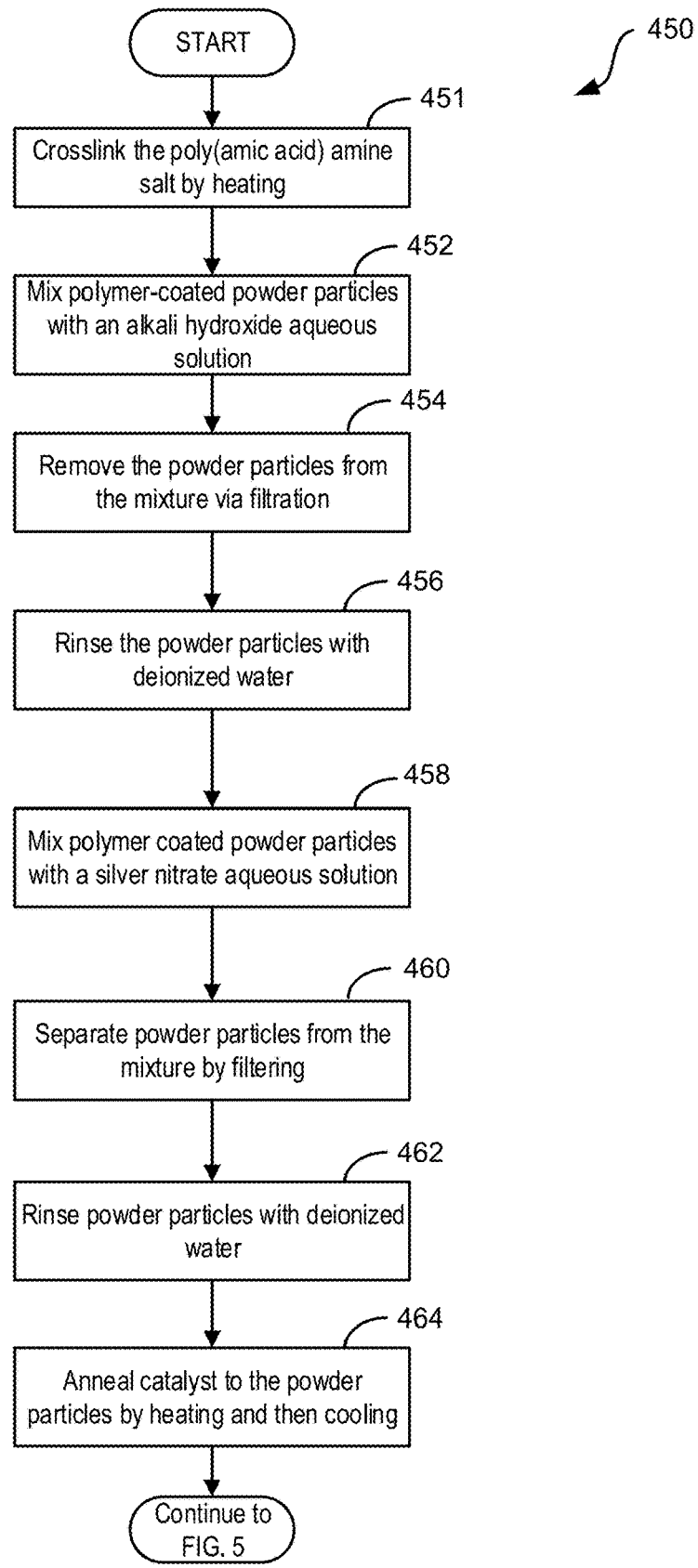
FIG. 4B shows a flow chart of an example method for applying a metal catalyst for an ELD reaction onto a cross-linkable polymer coating of an electrochemically active electrode material, in accordance with at least one embodiment of the present disclosure.

Alternatively, FIG. 4B shows an example method 450 for adhering a catalyst to a poly(amic acid) amine coating on a polymer-coated electrochemically active electrode material powder (e.g., polymer-coated active electrode material powder 104). Thus, method 450 may proceed from 312 of method 300 in FIG. 3, if a poly(amic acid) amine salt is used as the polymer for the polymer-coated electrochemically active electrode material. Method 450 may be substantially the same as method 400 except that prior to mixing, separating, rinsing, and annealing the catalyst and powder particles as described in 402-408 of method 400, method 450 may include the additional steps of mixing the polymer-coated powder particles with an alkali hydroxide solution. Whereas the lithium polyamate is neutralized with an alkali hydroxide during synthesis, the poly(amic acid) amine salt is neutralized with an organic amine such as diethanolamine or trimethylamine during its synthesis. Thus, the poly(amic acid) amine salt is not mixed with the alkali hydroxide solution until after it has been coated onto the polymer-coated electrochemically active electrode powder particles.

Method 450 begins at 451 which comprises crosslinking the poly(amic acid) amine salt by heating it. As one example the polymer-coated electrochemically active electrode powder particles comprising the poly(amic acid) amine salt coating may be heated to a temperature between 350-425° C. for between 15-60 minutes, which may be done either in air or an inert atmosphere such as argon or nitrogen. After cooling, method 450 may continue from 451 to 452 which comprises mixing the polymer-coated powder particles with an alkali hydroxide aqueous solution. As one example, the crosslinked polyimide coated powder may be mixed with an aqueous solution of an alkali hydroxide, preferably lithium or sodium hydroxide, for between 10-60 minutes. The alkali hydroxide solution may have a hydroxide concentration of between 0.5-2.5 molar, and may be heated to a temperature of between 40-80° C.

Method 450 then continues from 452 to 454 which comprises removing the powder particles from the mixture via filtration. After filtration, method 450 may continue from 454 to 456 which comprises rinsing the powder particles with deionized water. In particular, the powder may be washed with several additions of deionized water to remove any excess hydroxide. The powder is then mixed with silver nitrate and heated analogously to the powder utilized the un-crosslinked polyimide described above in method 400 of FIG. 4A. Thus, method 450 may continue to steps 458-464, which may be the same or similar to steps 402-408 already described above with reference to FIG. 4A. After performing steps 458-464, method 450 may then continue to 502 of method 500 in FIG. 5.

Figure 5:
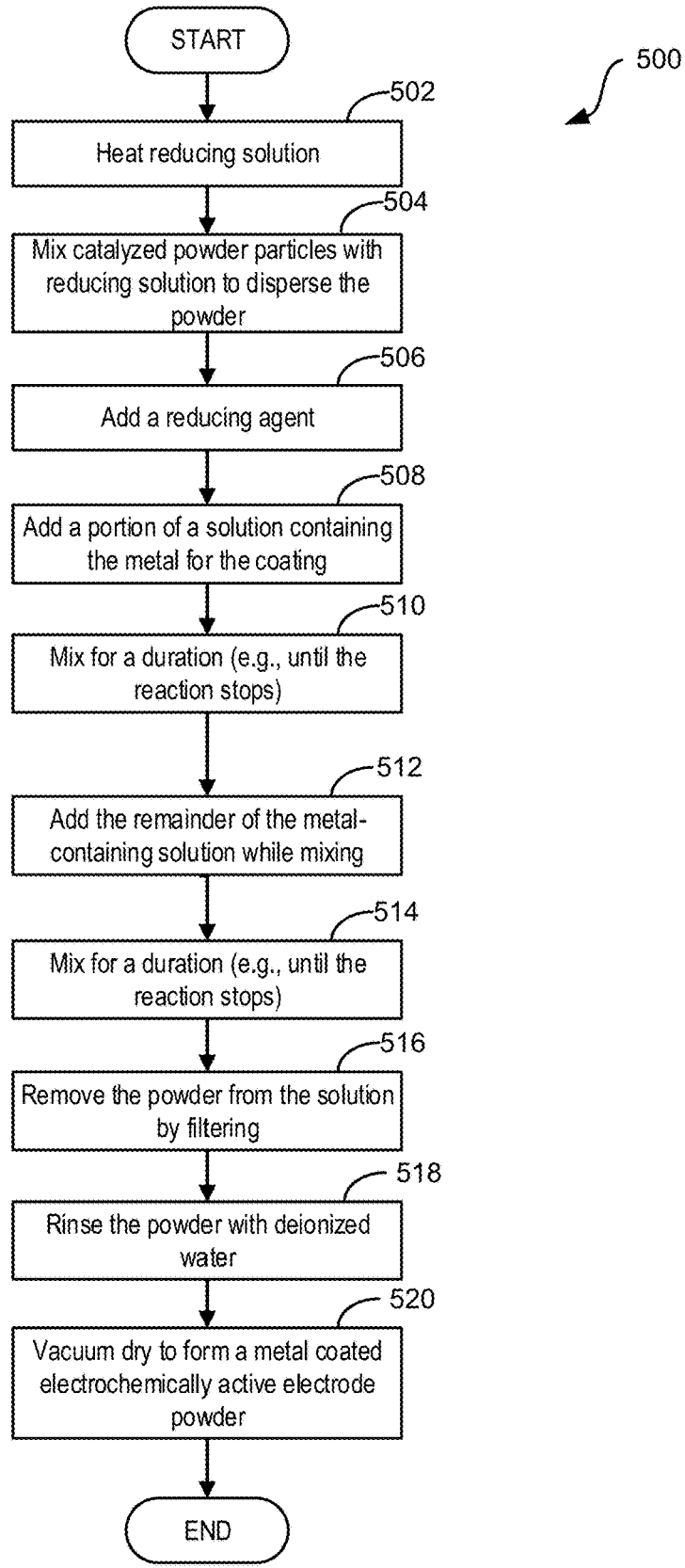
FIG. 5 shows a flow chart of an example method for coating an electrochemically active electrode material with a metal via ELD, in accordance with at least one embodiment of the present disclosure.

Continuing to FIG. 5, it shows an example method 500 for performing an ELD reaction to deposit a conductive metal (e.g., copper) onto a polymer-coated electrochemically active electrode powder that contains an ELD catalyst (e.g., catalyzed active electrode material powder 106 described above in FIGS. 1A and 1B). Thus, method 500 may continue from either 464 of FIG. 4B or 408 in FIG. 4A.

Method 500 begins at 502 which comprises heating a reducing solution (e.g., reducing solution 107 described above in FIGS. 1A and 1B). The reducing solution may be heated to between 50-80° C. Further, the reducing solution may continue to be heated during the ELD reaction (steps 508-514) and/or before the metal-containing solution (e.g., metal-containing solution 108 described above in FIGS. 1A and 1B) is added to the reducing solution and catalyzed powder particles. The reducing solution may be prepared by dissolving a buffer (e.g., buffer 141 described above in FIGS. 1A and 1B), surfactant (e.g., surfactant 142 described above in FIGS. 1A and 1B), anti-foaming agent (e.g., anti-foaming agent 143 described above in FIGS. 1A and 1B), and additives (e.g., additives 144 described above in FIGS. 1A and 1B) in enough deionized water to reach a volume of between 80-90% of the final volume of the reducing solution. The reducing agent (e.g., reducing agent 140 described above in FIGS. 1A and 1B) may be dissolved separately in deionized water (10-20% of final volume), and added immediately before use in order to prevent decomposition before the ELD reaction has begun (e.g., right before the metal-containing solution is added at 508).

Method 500 may continue from 502 to 504 which comprises mixing the catalyzed powder particles with the reducing solution to disperse the powder. Thus, the reducing solution (before addition of reducing agent) is heated up to the desired temperature, and then the catalyzed powder is added to the solution and mixed until fully dispersed. Next, at 506, the reducing agent is added to the reaction mixture comprising the reducing solution and the mixed catalyzed powder particles. The reducing agent may be dissolved in deionized water prior to being added to the reaction mixture. After a wait period of between 10 seconds and 5 minutes, a portion of the total metal-containing solution is added to the mixture. The reducing solution, metal-containing solution, and dispersed powder particles may comprise an ELD bath (e.g., ELD bath 109 described above in FIGS. 1A and 1B), and the ELD reaction may proceed once the metal-containing solution is added at 508.

Between 5-20% of the total volume of the metal source solution may be added initially (at 508), depending on the solid loading of the reaction mixture. Method 500 may then continue from 508 to 510 which comprises mixing the reaction mixture (ELD bath) for a duration to allow the ELD reaction to proceed. The ELD reaction may be allowed to proceed for between 30-120 minutes, or until the reaction has nearly stopped as evidenced by a significant decrease in hydrogen evolution.

The remainder of the metal-containing solution is then added at 512. In one example, the remainder of the metal source solution may be added slowly, over the span of between 30-240 minutes, in order to limit the rate of the ELD reaction. During the entire ELD reaction, the ELD bath may continue to be mixed. Thus, method 500 may continue from 512 to 514 which comprises continuing to mix the reaction mixture in the ELD bath for a duration (until the reaction stops). As one example, after all the metal source solution has been added, the reaction is allowed to proceed for an additional 30-120 minutes until there is no longer an appreciable amount of metal ions dissolved in the reaction mixture.

Method 500 then continues from 514 to 516 which comprises removing the powder from the solution by filtering. Subsequently at 518, the powder may be rinsed with deionized water. In one example, several aliquots of deionized water may be used to remove impurities from the powder. The powder may then then be vacuum dried at 520 to form a metal-coated electrochemically active electrode powder (e.g., metal-coated active electrode material powder 110 described above in FIGS. 1A and 1B). The powder may be dried under vacuum to remove residual water without oxidizing the metal surface. Method 500 then ends.

Turning now to FIGS. 6A-6F, they show various SEM images of example secondary particles from electrochemically active electrode materials. In particular, they show SEM images of an electrochemically active anode material comprising graphite. More specifically, they show SEM images of MesoCarbon MicroBeads (MCMBs).

Figure 6A:
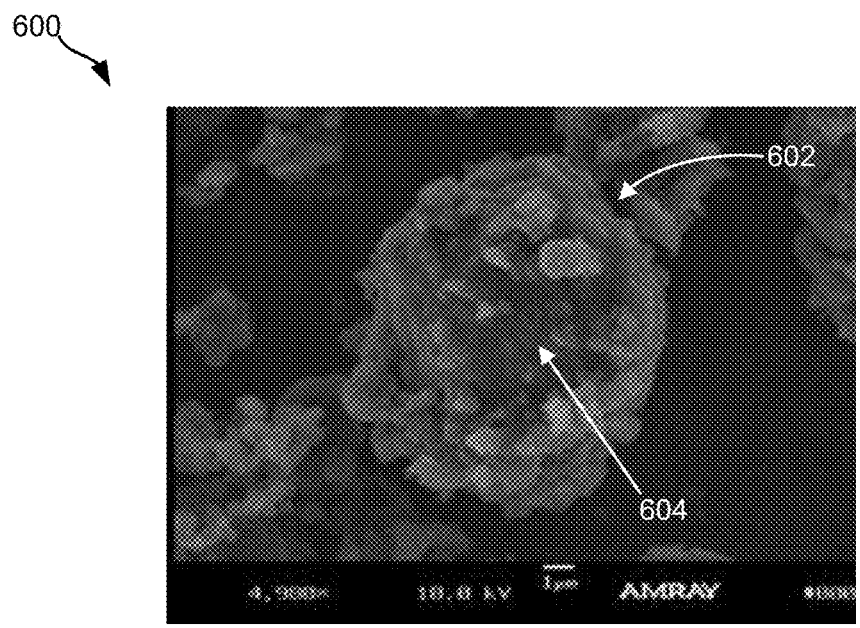
FIG. 6A shows a scanning electron microscope (SEM) image of an example electrochemically active electrode material sample comprising a plurality of un-coated secondary particles, in accordance with at least one embodiment of the present disclosure.

FIG. 6A shows a first SEM image 600 of an example secondary particle 602 of a MCMB that is bare and does not have a coating. Thus, the bare graphite exterior surface 604 of the secondary particle 602 is shown exposed in FIG. 6A.

Figure 6B:
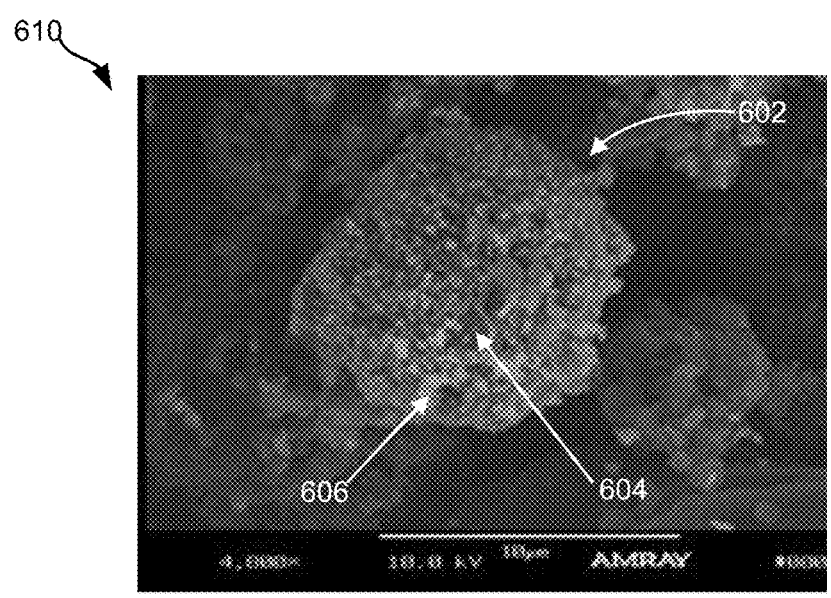
FIG. 6B shows a scanning electron microscope (SEM) image of an example electrochemically active electrode material sample comprising a plurality of secondary particles of an electrochemically active electrode material sample that has been coated with a metal but that has not been coated with a polymer.

FIG. 6B shows a second SEM image 610 of a secondary particle 602 of a MCMB that is coated with a conductive metal coating but not with a polymer coating (the secondary particle 602 is coated using an approach of the prior art that does not coat the secondary particle 602 with a polymer before applying the metal coating). The metal coating in FIG. 6B comprises a copper coating 606.

Figure 6C:
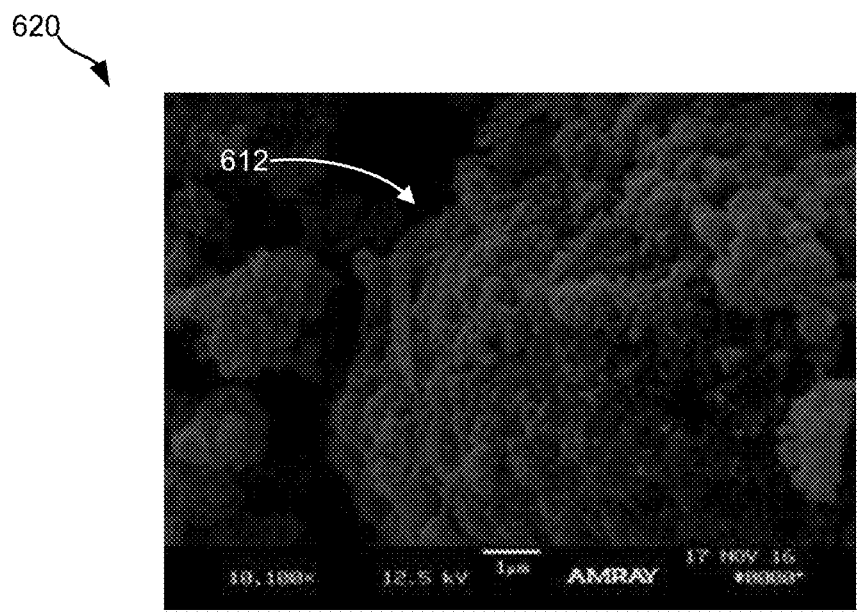
FIG. 6C shows a scanning electron microscope (SEM) image of an example electrochemically active electrode material sample comprising a plurality of secondary particles of an electrochemically active electrode material sample that has been coated with a metal and a polymer in accordance with one or more embodiments of the present disclosure without the addition of one or more additives.
Figure 6D:
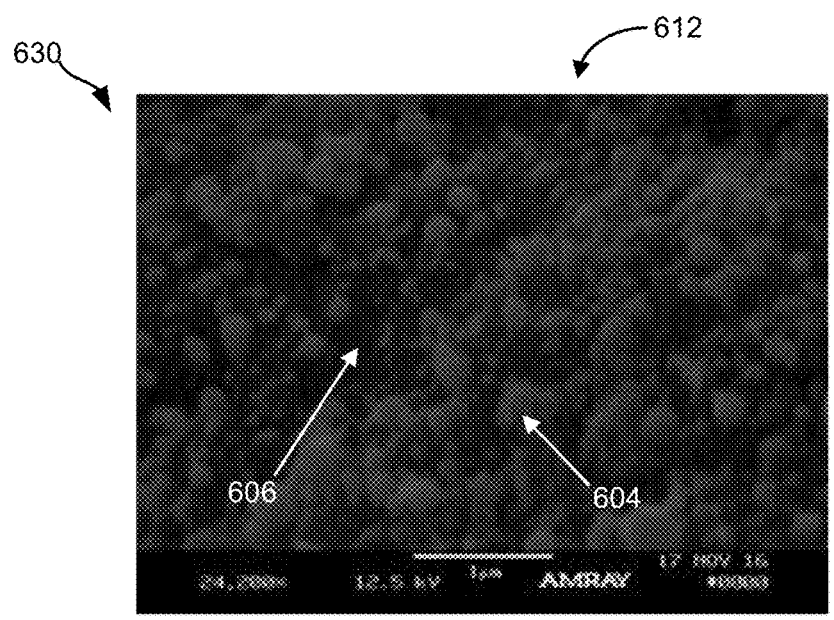
FIG. 6D shows a more magnified version of the SEM image of FIG. 6C, illustrating the metal coating on the secondary particles of the example electrochemically active electrode material sample, in accordance with at least one embodiment of the present disclosure.

FIG. 6C shows a third SEM image 620 of a secondary particle 602 of a MCMB that is coated with polymer coating and a conductive copper coating 606. The secondary particle 602 may be coated with a polymer and conductive copper coating 606 using one or more of the coating methods described above with reference to FIGS. 1A-5. However, the secondary particle 602 in FIG. 6C was coated without the use of additives (e.g., additives 144 described above in FIGS. 1A and 1B). FIG. 6D shows a fourth, more magnified image 630 of the third SEM image 620 of FIG. 6C.

Figure 6E:
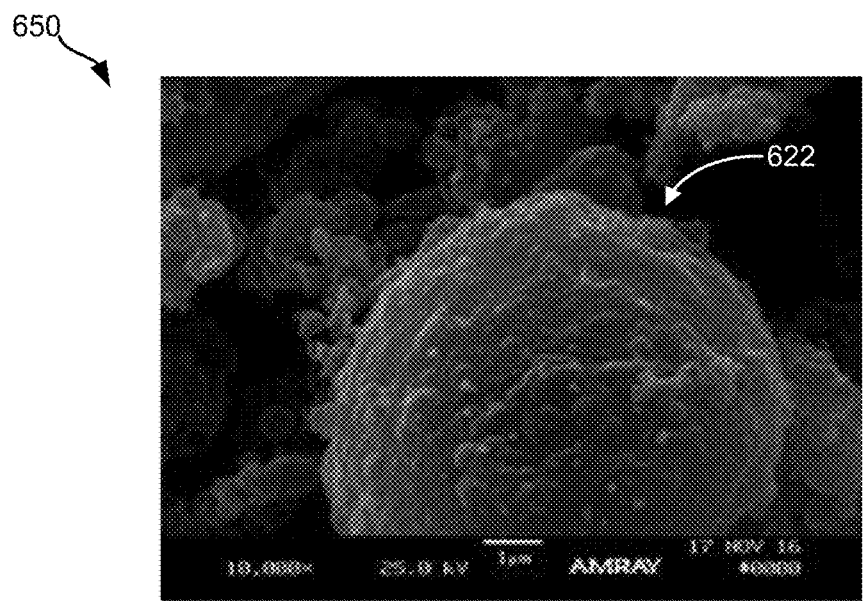
FIG. 6E shows a scanning electron microscope (SEM) image of an example electrochemically active electrode material sample comprising a plurality of secondary particles of an electrochemically active electrode material sample that has been coated with a continuous metal coating and a polymer in accordance with one or more embodiments of the present disclosure with the addition of one or more additives.
Figure 6F:
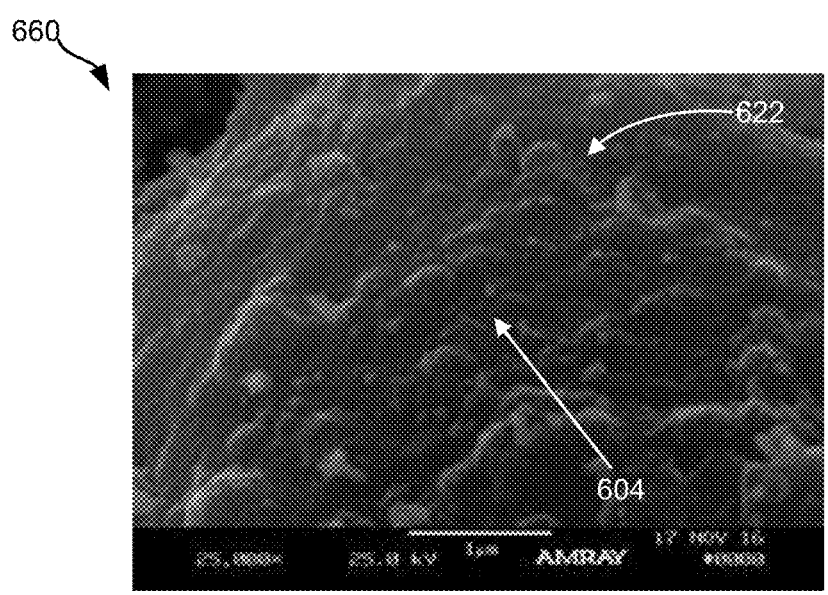
FIG. 6F shows a more magnified version of the SEM image of FIG. 6D, illustrating the continuous metal coating on the secondary particles of the example electrochemically active electrode material sample, in accordance with at least one embodiment of the present disclosure.

FIG. 6E shows a fifth SEM image 640 of a secondary particle 602 of a MCMB that is coated with a polymer coating and a conductive copper coating 606. The secondary particle 602 may be coated with a polymer and conductive copper coating 606 using one or more of the coating methods described above with reference to FIGS. 1A-5. Further, the secondary particle 602 in FIG. 6C was coated with the use of additives (e.g., additives 144 described above in FIGS. 1A and 1B) as opposed to the secondary particle 602 of FIGS. 6C and 6D. FIG. 6F shows a sixth, more magnified image 650 of the fifth SEM image 640 of FIG. 6E.

As can be seen from the SEM images in FIGS. 6A-6E, the metallized secondary particles coated using the polymer comprise a more continuous, smooth, and uniform metal coating than the secondary particles that do not contain the polymer coating. In particular, the MCMB graphite catalyzed in accordance with one or more of the embodiments disclosed herein showed no detachment of metal particles during processing, indicating that the adhesion was significantly improved relative to approaches where no polymer is used (prior art). Due do the better adhesion of the catalyst layer, the copper coating deposited onto this material (FIGS. 6C-6F) was significantly more continuous and less nodular than the MCMB graphite having no polymer layer (FIG. 6B). However, the copper deposit in FIGS. 6C and 6D was still somewhat discontinuous and had nodular surface morphology. Adding between 1-50 ppm each of a suppressor (example: benzotriazole, "BTA") and an accelerator (sodium 3-(mercaptopropyl)sulfonate, "MPS") was effective at inhibiting this nodular growth, which resulted in a completely continuous copper coating with uniform surface morphology, as shown in images 6E and 6F. Based on a specific surface area of the original powder of about 2 $m^2/g$ and a copper loading of about 12 wt %, the thickness of this copper layer was calculated to be about 150 nm.

Figure 7:
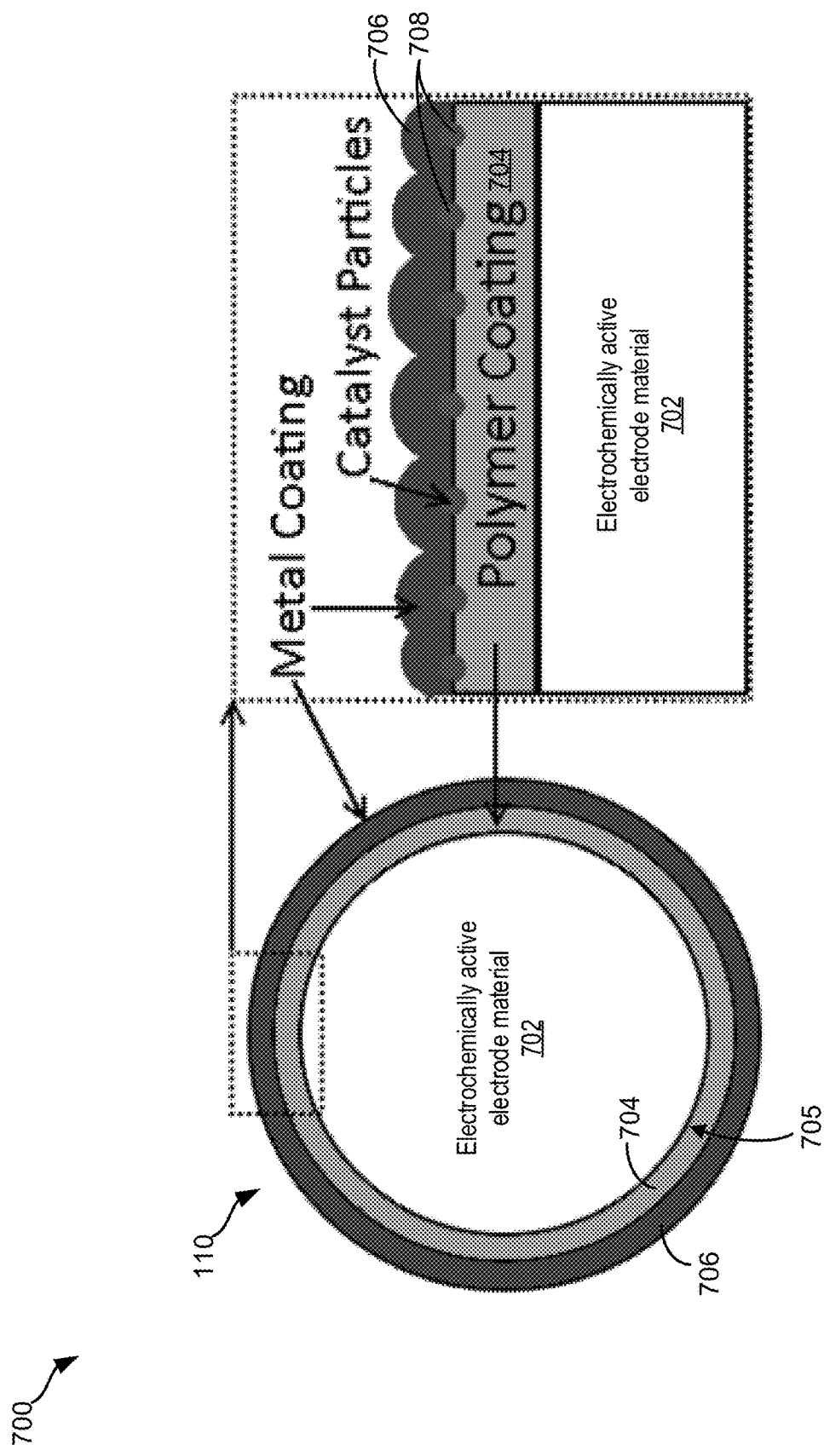
FIG. 7 shows a schematic of a cross-section of an example secondary particle of an electrochemically active electrode material that has been coated with a polymer and a metal in accordance with at least one of the coating methods described in the present disclosure.

Turning to FIG. 7, it shows a schematic 700 of a cross-sectional view of an example secondary particle of an electrochemically active electrode material that has been coated with a polymer and a conductive metal in accordance with one or more embodiments of the present disclosure. In particular, FIG. 7 show an example of the structure, morphology, and layering of a polymer coating, catalyst, and conducting metal coating on a secondary particle of an electrochemically active electrode material, when that material has been coated with the above components using one or more of the coating and/or metallization methods described above in FIGS. 1A-5.

Thus, FIG. 7, shows a schematic of a cross-sectional view of an example secondary particle of metal-coated active electrode material powder 110. The metal-coated active electrode material powder 110 includes electrochemically active electrode material 702, which may be the same or similar to electrochemically active electrode material 102 described above in FIG. 1A and/or FIG. 1B. Thus, the electrochemically active electrode material 702 may comprise graphite, for example. The electrochemically active electrode material may be coated with two layers: a polymer coating 704 positioned between an exterior surface 705 of the electrochemically active electrode material 702 and a metal coating 706. The polymer coating 704 comprises the polymer (e.g., aromatic polyimide), and the metal coating 706 comprises the conductive metal (e.g., copper). As can be seen from the example of FIG. 7, the polymer coating 704 and metal coating 706 may be completely continuous and substantially uniform in thickness. Thus, the polymer coating 704 may be completely continuous around the exterior surface 705 of the secondary particle of the electrochemically active electrode material 702 (completely covers all of the exterior surface 705). Although the two coatings 704 and 706 are depicted as having the same thickness, it should be appreciated that in other examples, the thicknesses of the coatings 704 and 706 may be different than one another. The thickness of the polymer coating 704 may be between 50-200 nm. The thickness of the metal coating 706 may be less than 150 nm and may be between 75 and 150 nm.

As described above in FIGS. 1A-1B and 3-4B, a catalyst may be applied to the polymer coating 704 and a low temperature thermal treatment 408 (e.g., 250-300° C. as described above in FIGS. 4A and 4B) may then be used to secure/anneal the catalyst particles 708 to the polymer coating 704. As shown in the example of FIG. 7, the catalyst particles 708 (e.g., silver particles) may protrude into the polymer coating 704, but do not protrude into or extend to the electrochemically active electrode material 702. Thus, the catalyst particles 708 become embedded in the polymer coating 704 during the process of applying the catalyst to the polymer coating 704 and heating. The catalyst particles 708 may also protrude into the metal coating 706. The areal density of the catalyst particles 708 on the surface of the polymer coating 704 of the electrochemically active electrode material 702 may be approximately 500-10,000 particles/$\mu m^2$.

As shown, the metal coating 706 may be completely continuous around the polymer coating 704 and catalyst particles 708. That is, the metal coating 706 may completely cover the catalyst particles 708 and all exterior facing surfaces of the polymer coating 704 not covered by the catalyst particles 708.

Continuing to FIG. 8, it shows a graph 800 reporting example test data for a lithium-ion battery cell that includes an electrode having an electrochemically active material coated with a conductive metal in accordance with one or more embodiments of the present disclosure. In particular, electrodes were prepared using both Cu-coated MCMB (shown as plot 802 in FIG. 8) and the unmodified MCMB ("control" in FIG. 8 shown as plots 804 and 806). Both electrodes were fabricated by applying active material slurry to copper foil, using the same formulation of binders and conductive additives as described above in FIGS. 1A and 1B. The electrodes were designed to have the same areal capacity and porosity in order to isolate the effect of the copper coating. Half cells were assembled versus lithium foil and discharged at different rates. At a rate of 10 C (full discharge in 6 minutes), the Cu-coated MCMB was capable of discharging about 81% (plot 802) of its nominal capacity, while the control discharged only about 66% of its nominal capacity (plots 804 and 806).

In this way, better uniformity and adhesion of the catalyst nanoparticles to the electrochemically active electrode material may be achieved by the novel formation mechanism disclosed herein. Unlike traditional methods where precious metal nanoparticles are nucleated on the surface of the substrate, in this case the nanoparticles nucleate homogeneously in the bulk of the precious metal impregnated polymer. The catalyst nanoparticles subsequently coalesce and migrate towards the surface of the polymer, naturally forming a close-packed structure. Because the amount of precious metal ion adsorption is stoichiometric to the number of polymer repeat units, and the polymer has a uniform composition, the areal loading of the catalyst is directly proportional to the thickness of the polymer coating. In particular the areal density of the catalyst on the surface of the polymer coating of the electrochemically active electrode material may be approximately 500-10,000 particles/$\mu m^2$.

Therefore, so long as the polymer coating is continuous and uniform, then the catalyst layer will be close packed and uniform. This close-packed catalyst structure allows continuous coatings near the theoretical minimum thickness to be created, due to the inherent lack of defects. Additionally, since the polymer has noble metal capturing ability, the process is insensitive to the surface chemistry of the substrate and does not require any other pretreatments.

Due to the migration of catalyst particles from the bulk of the polymer to its surface, there is a strong mechanical interlocking between the catalyst particles and the entanglements within the polymer, which results in significantly improved adhesion of the catalyst particles, and the subsequent ELD metal coating. When the catalyst particles are nucleated on the surface of the polymer using an aqueous reducing agent, this type of interlocking does not occur. The superior adhesion significantly reduces the sensitivity of catalyst performance to the chemistry and processing conditions of the ELD process, which simplifies development and optimization of such a process. This low sensitivity allows for the use solid loading greater than three orders of magnitude higher during the ELD reaction when compared to the prior art, which results in higher throughput and lower costs for the process.

Additionally, the polymer coating process (FIG. 3) utilizes a plasticizer to allow for mechanical attenuation of coating via milling without raising temperature above glass transition temperature of polymer. This results in completely continuous and uniform polyimide coatings at loadings less than 3%. Further, it produces a fine powder which is free of agglomeration without the need for additives to control agglomeration, and is predominately water based. Additionally this polymer coating process avoids the use of high-temperature or high pressure equipment.

The catalyst process results in better uniformity of catalyst layer due to uniform composition and thickness of polyimide and homogeneous nucleation of catalyst particles from the polyimide. Further the catalyst process (FIGS. 4A and 4B), results in substantially better adhesion due to mechanical interlocking of catalyst particles with polymer entanglements resulting from homogeneous nucleation mechanism and is not highly dependent on surface chemistry of substrate material because the polyimide has sufficient PM capturing functionality. Still further, the catalyst process avoids the use of palladium and has a higher yield with silver than methods from prior art.

Further, the ELD process (FIG. 5) is far less sensitive to processing conditions, especially mechanical stresses, than the methods not using a polymer coating. As a result it uses much higher solid loadings which allows for the use of smaller solution volumes and thus smaller equipment, leading to reduced capital and operating costs, as well as a decrease in waste generation. Further, utilizing additives suppress nodular growth resulting in a more uniform coating.

In this way, the metal coatings produced by these methods exhibit: complete or near-complete continuity, a thickness of about 150 nm, allowing continuous coatings to be applied using a loading of about 10 wt %, more even surface morphology resulting in lower specific surface area.

In this way, the composite materials produced by depositing metal coatings on active material powders show improved high-rate discharge capability due to conductive metal coating and negligible decrease in volumetric capacity, allowing materials to be incorporated into existing battery designs with the potential to improve cycle life, energy density, and high rate charge capability.

The process described herein for coating the polymer onto the surface of the powder is superior to the prior art in that it doesn't use a significant amount of organic solvents. The initial polymer application is completely water based, and the non-solvent used in the milling process can be separated by filtration and recycled back to the process. This recycling process avoids energy intensive unit operations such as vaporization and condensation, and does not require any purification of non-solvent. The process described herein also does not require the use of volatile organic compounds in high-pressure or high-temperature equipment.

Metal coatings produced via this process show complete continuity and smooth surface morphology with thicknesses of less than 150 nm. As a result, continuous metal coatings can be deposited onto active material powders with metal loadings of less than about 10 wt %. Although this slightly reduces the gravimetric energy storage capacity of the active material, the decrease in volumetric capacity is negligible due to the low thickness and high density of the metal coating. Therefore, surface modification of active materials using this process is viable for producing materials with improved performance. For example, the discharge capability of MCMB graphite at a rate of 10 C increased by 23% as a result of copper coating, while the volumetric capacity was not significantly affected.

Various modifications of the present invention, in addition to those shown and described herein, will be apparent to those skilled in the art of the above description. Such modifications are also intended to fall within the scope of the appended claims/The foregoing description is illustrative of particular embodiments of the invention, but is not meant to be a limitation upon the practice thereof. The foregoing discussion should be understood as illustrative and should not be considered limiting in any sense. While the inventions have been particularly shown and described with references to preferred embodiments thereof, it will be understood by those skilled in the art that various changes in form and details may be made therein without departing from the spirit and scope of the inventions as defined by the claims. The corresponding structures, materials, acts and equivalents of all means or steps plus function elements in the claims below are intended to include any structure, material or acts for performing the functions in combination with other claimed elements as specifically claimed.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. An electrochemically active electrode material, comprising:
   a continuous polymer coating coupled directly to an exterior surface of the electrochemically active electrode material;
   a metal catalyst adhered to the continuous polymer coating for catalyzing an electroless deposition (ELD) reaction; and
   a continuous metal coating that completely covers the metal catalyst and the continuous polymer coating.

2. The electrochemically active electrode material of claim 1, wherein the electrochemically active electrode material comprises an electrochemically active material for an anode of a lithium-ion battery.

3. The electrochemically active electrode material of claim 1, wherein the electrochemically active electrode material comprises one of a graphite powder, and graphite MesoCarbon MicroBeads (MCMBs).

4. The electrochemically active electrode material of claim 1, wherein the continuous metal coating comprises copper.

5. The electrochemically active electrode material of claim 1, wherein the metal catalyst comprises a precious metal including one or more of: palladium, platinum, rhodium, gold, and silver.

6. The electrochemically active electrode material of claim 1, wherein the continuous polymer coating comprises one of an aromatic polyimide, lithium polyamate, alternating monomer units of a diamine and a dianhydride, a cross-linked poly(amic acid) amine salt, and a heat-treated aromatic poly(amic acid).

7. The electrochemically active electrode material of claim 1, wherein the continuous polymer coating is between 1-5% by weight of the electrochemically active electrode material.

8. The electrochemically active electrode material of claim 1, wherein the continuous metal coating is between 5-20% by weight of the electrochemically active electrode material.

9. The electrochemically active electrode material of claim 1, wherein the metal catalyst is between 0.01-1.0% by weight of the electrochemically active electrode material.

10. The electrochemically active electrode material of claim 1, wherein a thickness of the continuous metal coating is between 75-150 nm.

11. The electrochemically active electrode material of claim 1, wherein the metal catalyst is discontinuous on an exterior surface of the continuous polymer coating, and wherein an areal density of the metal catalyst on the continuous polymer coating is between 500-10,000 particles/$\mu m^2$.

12. The electrochemically active electrode material of claim 1, wherein the metal catalyst is continuous on an exterior surface of the continuous polymer coating.

13. The electrochemically active electrode material of claim 1, wherein the continuous metal coating has a uniform thickness.

14. The electrochemically active electrode material of claim 1, wherein the continuous metal coating has a non-uniform thickness, and wherein the continuous metal coating comprises a substantially smooth exterior surface such that a radial distance between the exterior surface of the electrochemically active electrode material and the exterior surface of the continuous metal coating is substantially the same around the entire exterior surface of the electrochemically active electrode material.

15. The electrochemically active electrode material of claim 1, wherein the continuous metal coating is formed by the ELD reaction.

16. A coated electrochemically active electrode powder, comprising:
   an electrochemically active electrode powder particle;
   a polymer coated directly onto an exterior surface of the electrochemically active electrode powder particle;
   a metal catalyst coupled to the polymer for catalyzing an electroless deposition (ELD) reaction; and
   a continuous metal coating that completely covers the metal catalyst and the polymer.

17. The coated electrochemically active electrode powder of claim 16, wherein the electrochemically active electrode powder particle comprises a secondary particle having a diameter between 1-50 $\mu m$.

18. The coated electrochemically active electrode powder of claim 16, wherein the electrochemically active electrode powder particle comprises graphite.

19. The coated electrochemically active electrode powder of claim 16, wherein the polymer comprises one of lithium polyamate, and a cross-linked poly(amic acid) amine salt.

20. The coated electrochemically active electrode powder of claim 16, wherein the polymer forms a continuous coating on the exterior surface of the electrochemically active electrode powder particle such that the entire exterior surface of the electrochemically active electrode powder particle is covered by the polymer.

21. The coated electrochemically active electrode powder of claim 20, wherein a thickness of the continuous coating of the polymer on the exterior surface of the electrochemically active electrode powder is between 50-200 nm.

22. The coated electrochemically active electrode powder of claim 20, wherein the continuous coating of the polymer comprises a uniform thickness.

23. A battery cell, comprising an electrode, the electrode comprising a coated electrochemically active electrode material, the coated electrochemically active electrode material comprising powder particles having a continuous polymer coating coupled directly to an exterior surface of the powder particles, a continuous metal coating that completely covers the continuous polymer coating, and a metal catalyst adhered to the continuous polymer coating for catalyzing an electrodeless deposition (ELD) reaction, wherein the continuous polymer coating is positioned between the continuous metal coating and the exterior surface of the powder particles, and the metal catalyst is positioned between the continuous polymer coating and the continuous metal coating.

24. The battery cell of claim 23, wherein the coated electrochemically active electrode material comprises graphite or another electrochemically active material for an anode of a lithium-ion battery cell.

25. The battery cell of claim 23, wherein the powder particles comprise a metal catalyst adhered to the polymer coating for catalyzing an electroless deposition (ELD) of the metal coating on the powder particles.

26. The battery cell of claim 23, wherein a capacity of the battery cell at a C-rate of 10 C is at least 80% of a maximum capacity of the battery cell.

27. A method for metallizing a powder particle of an electrochemically active electrode material, comprising:
- coating an exterior surface of the powder particle with a continuous layer of a polymer;
- annealing a metal catalyst for an electroless deposition (ELD) reaction to the polymer, followed by a low temperature thermal treatment; and
- depositing a continuous layer of a metal that completely covers the metal catalyst and the polymer via ELD.

28. The method of claim 27, wherein the electrochemically active electrode material comprises graphite.

29. The method of claim 27, wherein the metal catalyst comprises one or more of: palladium, platinum, rhodium, gold, and silver and wherein the metal comprises copper.

30. The method of claim 27, wherein the polymer comprises one or more of: an aromatic polyimide, lithium polyamate, and a cross-linked poly(amic acid) amine salt.

31. The method of claim 27, wherein the coating the exterior surface of the powder particle with the continuous layer of the polymer comprises one or more of: dissolving the polymer in a solvent to form a polymer solution; mixing the polymer solution with the electrochemically active electrode material; drying the polymer solution containing the electrochemically active electrode material to a solid; grinding the solid down to form the powder particle; ball milling the powder particle with a non-solvent; and removing the powder particle from the non-solvent by filtering.

32. The method of claim 27, wherein the annealing the metal catalyst to the polymer is performed after the polymer has been coated onto the powder particle.

33. The method of claim 27, wherein the annealing comprises one or more of: depositing the metal catalyst on the powder particle having the continuous layer of the polymer by mixing the powder particle with a solution containing the metal catalyst; isolating the powder particle from the solution by filtering the powder particle out from the solution; rinsing the powder particle with deionized water; and heating the powder particle having the continuous layer of the polymer and deposited metal catalyst.

34. The method of claim 33, wherein the annealing the metal catalyst to the polymer further comprises mixing the powder particle having the continuous layer of the polymer with an alkali hydroxide solution prior to mixing the powder particle with the solution containing the metal catalyst.

35. The method of claim 33, wherein the solution containing the metal catalyst comprises an aqueous silver nitrate solution.

36. The method of claim 27, wherein the depositing the continuous layer of the metal on the metal catalyst and the polymer via ELD comprises performing the ELD reaction, wherein performing the ELD reaction comprises one or more of: mixing the powder particle with a reducing solution, reducing agent, and a solution containing the metal; isolating the powder particle by filtering the powder particle out from the mixture of the reducing solution, reducing agent, and solution containing the metal; rinsing the powder particle with deionized water; and drying the powder particle to remove the deionized water.

37. The method of claim 27, wherein the depositing the continuous layer of the metal on the metal catalyst and the polymer via ELD is performed after the powder particle has been coated with the continuous layer of the polymer and after the metal catalyst has been annealed to the polymer.

38. A coated electrochemically active electrode powder, comprising:
- an electrochemically active electrode powder;
- a metal coating; and
- a polymer coating positioned between an exterior surface of the electrochemically active electrode powder and the metal coating.

39. The coated electrochemically active electrode powder of claim 38, wherein the metal coating is continuous and completely covers the polymer coating.

40. The coated electrochemically active electrode powder of claim 38, further comprising a metal catalyst applied to the polymer coating for catalyzing an electroless deposition (ELD) reaction.

41. The coated electrochemically active electrode powder of claim 38, wherein a thickness of the metal coating is less than 150 nm.

* * * * *